US007827175B2

(12) United States Patent
Plow et al.

(10) Patent No.: US 7,827,175 B2
(45) Date of Patent: Nov. 2, 2010

(54) FRAMEWORK REACTIVE SEARCH FACILITY

(75) Inventors: Gregory M. Plow, Gilroy, CA (US); Farrokh E. Pourmirzaie, San Jose, CA (US); Reiner Kraft, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 10/866,295

(22) Filed: Jun. 10, 2004

(65) Prior Publication Data

US 2005/0278312 A1 Dec. 15, 2005

(51) Int. Cl.
*G06F 17/00* (2006.01)
(52) U.S. Cl. ........................................ 707/728; 707/733
(58) Field of Classification Search .................. 707/3, 707/4, 5
See application file for complete search history.

(56) References Cited

U.S. PATENT DOCUMENTS

| | | | |
|---|---|---|---|
| 5,623,652 A | 4/1997 | Vora et al. | |
| 5,715,443 A | 2/1998 | Yanagihara et al. | 395/603 |
| 5,902,352 A | 5/1999 | Chou et al. | |
| 5,907,837 A | 5/1999 | Ferrel et al. | |
| 5,963,940 A | 10/1999 | Liddy et al. | |
| 5,974,406 A | 10/1999 | Bisdikian et al. | |
| 5,983,214 A | 11/1999 | Lang et al. | |
| 6,029,165 A | 2/2000 | Gable | |
| 6,049,776 A | 4/2000 | Donnelly et al. | |
| 6,052,670 A | 4/2000 | Johnson | |
| 6,161,102 A | 12/2000 | Yanagihara et al. | 707/3 |
| 6,292,806 B1 | 9/2001 | Sandifer | |
| 6,327,590 B1 * | 12/2001 | Chidlovskii et al. | 707/5 |
| 6,356,921 B1 | 3/2002 | Kumar et al. | |
| 6,401,104 B1 | 6/2002 | LaRue et al. | |
| 6,480,830 B1 | 11/2002 | Ford et al. | 705/9 |
| 6,564,383 B1 | 5/2003 | Combs et al. | |
| 6,594,654 B1 | 7/2003 | Salam et al. | |
| 6,598,046 B1 | 7/2003 | Goldberg et al. | |
| 6,633,867 B1 | 10/2003 | Kraft et al. | 707/3 |
| 6,636,848 B1 | 10/2003 | Aridor et al. | |
| 6,647,383 B1 | 11/2003 | August et al. | 707/3 |

(Continued)

OTHER PUBLICATIONS

Pauer, Eric K., et al.; "A Performance Modeling Framework Applied to Real Time Infrared Search and Track Processing", VHDL International Users' Forum, 1997. Proceedings, Oct. 19-22, 1997, pp. 33-42.

(Continued)

*Primary Examiner*—Pierre M Vital
*Assistant Examiner*—Christopher J Raab
(74) *Attorney, Agent, or Firm*—Kunzler Needham Massey & Thorpe

(57) ABSTRACT

A search request from a user is received wherein the search request comprises a search framework profile and at least one search term. An accumulated result set of identifiers is generated wherein each identifier within the set of identifiers facilitates access to a corresponding unit of information in a data store, and wherein the corresponding unit of information comprises the at least one search term. The identifiers of the accumulated result set are ranked in accordance with the degree of affinity of each of the corresponding units of information to the search framework profile to form a final result set. The final result set is then delivered to the user.

84 Claims, 22 Drawing Sheets

U.S. PATENT DOCUMENTS

| | | | |
|---|---|---|---|
| 6,662,177 B1 | 12/2003 | Martino et al. | |
| 6,718,518 B1 | 4/2004 | Plow et al. | |
| 6,842,761 B2* | 1/2005 | Diamond et al. | 707/104.1 |
| 6,915,294 B1 | 7/2005 | Singh et al. | |
| 6,941,519 B1 | 9/2005 | Jerome et al. | |
| 6,976,018 B2* | 12/2005 | Teng et al. | 707/3 |
| 7,010,782 B2 | 3/2006 | Narayan et al. | |
| 7,016,919 B2 | 3/2006 | Cotton et al. | |
| 7,092,934 B1 | 8/2006 | Mahan et al. | |
| 7,107,550 B2 | 9/2006 | Newman | |
| 7,111,253 B2 | 9/2006 | Newman | |
| 7,117,207 B1* | 10/2006 | Kerschberg et al. | 707/5 |
| 7,134,082 B1 | 11/2006 | Choi | |
| 7,149,983 B1* | 12/2006 | Robertson et al. | 715/810 |
| 7,185,333 B1 | 2/2007 | Shafron | |
| 7,240,092 B2 | 7/2007 | Houghton et al. | |
| 7,386,586 B1 | 6/2008 | Headley et al. | |
| 7,388,950 B2 | 6/2008 | Elsey et al. | |
| 2001/0054054 A1* | 12/2001 | Olson | 709/1 |
| 2002/0004734 A1 | 1/2002 | Nishizawa | |
| 2002/0059201 A1 | 5/2002 | Work | |
| 2002/0149615 A1 | 10/2002 | Rajarajan et al. | |
| 2002/0169856 A1 | 11/2002 | Plow et al. | |
| 2002/0186240 A1 | 12/2002 | Eisenberger et al. | |
| 2003/0028792 A1 | 2/2003 | Plow et al. | |
| 2003/0093409 A1 | 5/2003 | Weil et al. | 707/3 |
| 2003/0131353 A1 | 7/2003 | Blom et al. | |
| 2003/0149580 A1 | 8/2003 | Moores et al. | 705/1 |
| 2003/0172075 A1 | 9/2003 | Reisman et al. | |
| 2003/0172094 A1 | 9/2003 | Lauria et al. | |
| 2003/0182282 A1 | 9/2003 | Ripley | 707/5 |
| 2003/0212673 A1 | 11/2003 | Kadayam et al. | |
| 2003/0220909 A1 | 11/2003 | Farrett | 707/3 |
| 2003/0229624 A1 | 12/2003 | Petrisor et al. | 707/3 |
| 2004/0093735 A1* | 5/2004 | Ohtsubo et al. | 30/50 |
| 2004/0113938 A1 | 6/2004 | Akerfeldt | |
| 2005/0071328 A1* | 3/2005 | Lawrence | 707/3 |
| 2005/0076017 A1 | 4/2005 | Rein et al. | |
| 2005/0111856 A1 | 5/2005 | Kawai | |
| 2005/0125273 A1 | 6/2005 | Simons et al. | |
| 2005/0222981 A1* | 10/2005 | Lawrence et al. | 707/3 |
| 2005/0278288 A1 | 12/2005 | Plow et al. | 707/1 |
| 2005/0278312 A1 | 12/2005 | Plow et al. | |
| 2005/0278313 A1 | 12/2005 | Plow et al. | 707/3 |
| 2006/0047649 A1* | 3/2006 | Liang | 707/4 |
| 2007/0218434 A1 | 9/2007 | Habichler et al. | |
| 2008/0281901 A1 | 11/2008 | Lusher et al. | |

OTHER PUBLICATIONS

Prasad Kantamneni, R.G., et al.; "Personalization of Information Retrieval Through User Profiling", Systems, Man, and Cybernetics, 2001 IEEE International Conference, Oct. 7-10, 2001, vol. 5, pp. 3475-3478.

Ching-Chi Hsu et al: "Constructing personal digital library by multi-search and customized category" Tools with Artificial Intelligence, 1998. Proceedings. Tenth IEEE International Conference on Taipei, Taiwan Nov. 10-12, 1998, Piscataway, NJ, USA, IEEE, US, Nov. 10, 1998, pp. 148-155, XP010319819, ISBN:0-7803-5214-9.

Stenmark D: "Turning racit knowledge tangible" System Sciences, 2000. Proceedings o fthe 33rd annual Hawaii International Conference on Jan. 4-7, 2000, Piscataway, NJ, USA, IEEE< Jan. 4, 2000, pp. 906-914, XP010545329, ISBN: 0-7695-0493-0.

Nina Saklikar: "Editing Search Profile" DBWIZ, [Online] Jun. 30, 2003, XP002401567, Canada, Retrieved from the Internet: URL: http://dbwiz.lib.sfu.ca/dbwiz/doc/admin_doc/editing_search_profiles.html> [retrieved on Oct. 4, 2006].

Xu et al., "MIETTA—A Framework for Uniform and Multilingual Access to Structured Database and Web Information", Nov. 2000, ACM pp. 41-48.

Rubin et al., "An Efficient Profile-Analysis Framework for Data-Layout Optimizations", Jan. 2002, ACM, vol. 37, Issue 1, pp. 140-153.

* cited by examiner

| | | | |
|---|---|---|---|
| SEARCHER | MODE | LAYPERSON | YES |
| SEARCHER | MODE | PROFESSIONAL | NULL |
| SEARCHER | MODE | INDIVIDUAL | YES |
| SEARCHER | MODE | BUSINESS | NULL |
| SEARCHER | LEVEL | CHILD | NULL |
| SEARCHER | LEVEL | PRE-TEEN | NULL |
| SEARCHER | LEVEL | TEEN | NULL |
| SEARCHER | LEVEL | ADULT | YES |
| SEARCHER | LANGUAGE | ENGLISH | YES |
| SEARCHER | LANGUAGE | FRENCH | NULL |
| SEARCHER | PROFESSION | CARPENTER | YES |
| SEARCHER | PROFESSION | PLUMBER | NULL |
| OBJECTIVE | SHOP | RETAIL | NULL |
| OBJECTIVE | SHOP | AUCTION | NULL |
| OBJECTIVE | ACTIVITY | EVALUATE | NULL |
| OBJECTIVE | ACTIVITY | REPAIR | YES |
| OBJECTIVE | ACTIVITY | BUILD | NULL |
| OBJECTIVE | ACTIVITY | INQUIRE | NULL |
| DOMAIN | SRCH_DOMAIN | .GOV | YES |
| DOMAIN | SRCH_DOMAIN | .EDU | YES |
| DOMAIN | SRCH_DOMAIN | .COM | NULL |
| DOMAIN | PAGE_TYPE | SCHOOL | NULL |
| ... | ... | ... | ... |

| | | | |
|---|---|---|---|
| SEARCHER | MODE | LAYPERSON | 15% |
| SEARCHER | MODE | PROFESSIONAL | 73% |
| SEARCHER | MODE | INDIVIDUAL | 93% |
| SEARCHER | MODE | BUSINESS | 6% |
| SEARCHER | LEVEL | CHILD | 3% |
| SEARCHER | LEVEL | PRE-TEEN | 5% |
| SEARCHER | LEVEL | TEEN | 19% |
| SEARCHER | LEVEL | ADULT | 77% |
| SEARCHER | LANGUAGE | ENGLISH | 98% |
| SEARCHER | LANGUAGE | FRENCH | 1% |
| SEARCHER | PROFESSION | CARPENTER | 64% |
| SEARCHER | PROFESSION | PLUMBER | 38% |
| OBJECTIVE | SHOP | RETAIL | 11% |
| OBJECTIVE | SHOP | AUCTION | 1% |
| OBJECTIVE | ACTIVITY | EVALUATE | 6% |
| OBJECTIVE | ACTIVITY | REPAIR | 89% |
| OBJECTIVE | ACTIVITY | BUILD | 14% |
| OBJECTIVE | ACTIVITY | INQUIRE | 1% |
| DOMAIN | SRCH_DOMAIN | .GOV | 0% |
| DOMAIN | SRCH_DOMAIN | .EDU | 100% |
| DOMAIN | SRCH_DOMAIN | .COM | 0% |
| DOMAIN | PAGE_TYPE | SCHOOL | 83% |
| ⋮ | ⋮ | ⋮ | ⋮ |

FRAMEWORK REACTIVE SEARCH FACILITY

CROSS REFERENCE TO RELATED APPLICATIONS

This application is related to U.S. patent application Ser. No. 10/866,140, entitled SEARCH FRAMEWORK METADATA, filed on Jun. 10, 2004 for Gregory M. Plow, et al. and U.S. patent application Ser. No. 10/866,297, entitled SEARCH SCHEDULING AND DELIVERY, filed on Jun. 10, 2004 for Gregory M. Plow, et al., both of which are filed concurrently herewith and which are incorporated by reference in their entirety.

FIELD OF INVENTION

The present invention relates generally to search technology. More specifically, the present invention relates to a method for searching a data store for relevant information.

BACKGROUND

The significance of search engine technology is well known, and continues to receive more and more attention in the media. This is because search engines have become an indispensable connection to vast quantities of information for users of the world wide web. Like the Internet browser, a search engine may have millions of loyal users, wherein the leaders in this technology command significant mind share that can be leveraged to advantage in many other applications. Accordingly, intense competition exists between vendors offering search technology solutions.

The store of online information continues to grow exponentially, which in turn places increasing demands upon search engines to work more efficiently and to produce higher quality (i.e. more useful) results. Unfortunately, even in view of search engine technology advances, today's search engines have been unable to accommodate the needs of users in the face of this explosive data growth. It is not unusual for a search engine to return literally hundreds of result pages in response to a keyword search. Unfortunately, the tedious exercise of visiting each site to determine the set of relevant sites of potential interest is left as an exercise to the user. The loss of productivity is substantial, and the frustration of users is unacceptably high.

Prior art search engines limit a user's ability to communicate an accurate representation of the search task to be performed. Many non-topical search characteristics (i.e. any information other than search keywords) that would be desirable to specify are not currently possible. Of those non-topical search characteristics that can be specified, their specification is tedious and error prone. Many desirable non-topical search characteristics are not specifiable since there is currently no defined way for the search engine to determine the presence of the characteristic for any given web page.

There are many "non-topical" aspects of a search that may have a bearing on determining the potential usefulness of a search result. In addition to matching a particular search keyword, other questions of interest may be: Who is performing the search? What is the purpose of the search? Where should the search engine look for results? How often, when and where should the search results be delivered? For example, two different searchers enter the search keywords "root canal." One searcher is a dentist looking for information on new advances in the field. The other searcher is a dental patient looking for information to provide a basic understanding of the procedure to be performed on her tooth. Both receive the same search results, yet it is apparent that both searchers are looking for entirely different information. If searchers are able to communicate additional information about who they are and the purpose of their search, and if search engines are able to react to such non-topical data, individualized search results of higher relevancy can be realized.

Prior art search engines are unable to accommodate all potentially useful non-topical information in a comprehensive way, instead implementing only a select few options and choices for users to consider. Numerous problems arise when trying to manage a large amount of non-topical data. A comprehensive specification of non-topical data may be tedious and error prone in its specification; furthermore, even if these problems were resolved, the prior art search engines would be unable to determine the affinity of a web page search result to all the numerous non-topical specifications.

For the non-topical aspects of a search that are specifiable in the prior art, a problem arises for a user in establishing their specification. Each time a different type of search is performed, the user must re-evaluate and/or re-edit each non-topical specification prior to initiating the new search operation. This is because there is no convenient way in the prior art search technology for remembering patterns of specifications associated with commonly performed search operations.

Accordingly, there is a great need to provide a way to receive and manage a wide variety of non-topical search specifications that more accurately encapsulate the set of characteristics that make a search result useful to a searcher. Furthermore, there is also a great need for determining the presence of these various characteristics in a web page such that the usefulness of a web page containing one or more specified search keywords can be evaluated. Further still, there is a need to remember patterns of non-topical search specifications associated with types of searches commonly performed by a particular user. A search engine technology that can enhance the relevancy of search results and enhance user productivity will have a significant advantage in the marketplace.

SUMMARY OF THE INVENTION

To overcome these limitations in the prior art briefly described above, the present invention provides a method for delivering search results responsive to a user search request wherein the relevancy of search results are improved and gains in user productivity are achieved.

A search request from a user is received wherein the search request comprises a search framework profile and at least one search term. An accumulated result set of identifiers is generated wherein each identifier within the set of identifiers facilitates access to a corresponding unit of information in a data store, and wherein the corresponding unit of information comprises the at least one search term. The identifiers of the accumulated result set are ranked in accordance with the degree of affinity of each of the corresponding units of information to the search framework profile to form a final result set. The final result set is then delivered to the user.

In another embodiment of the present invention, a method is provided for creating a search framework profile for use with a framework reactive search facility. An SFP Wizard is activated responsive to a user request. User input is received responsive to data displayed by the SFP Wizard. The user input is saved in a repository wherein the search framework profile comprises the user input.

In still another embodiment of the present invention, a method is provided for information interchange between a plurality of search engines. Information related to processing by a first search engine is stored in a first area associated with a search framework profile. At least a subset of the information from the first area is retrieved by a second search engine.

In yet other embodiments of the present invention, the above-described methods may be provided as a computer system or be tangibly embodied in and/or readable from a computer-readable medium containing program code (or alternatively, computer instructions.) Program code, when read and executed by a computer system, causes the computer system to perform the above-described method.

Utilizing the present invention, a user may perform searches in a more efficient manner, be more productive in obtaining meaningful search results and receive search results with a higher degree of relevancy to the user's needs. A search facility delivering these benefits to a user will have a significant advantage in the marketplace.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples in accordance with the present invention.

BRIEF DESCRIPTION OF THE DRAWINGS

The present invention is described in conjunction with the appended drawings identified below. To facilitate understanding, identical reference numerals have been used, where possible, to designate identical elements that are common to a plurality of figures, and wherein:

FIG. 20 shows an exemplary relational database table implementation of a search framework profile;

FIG. 21 shows an exemplary relational database table implementation of a repository of composite relative strength search framework metadata for a unit of information.

DETAILED DESCRIPTION

The present invention overcomes the limitations discussed supra associated with the prior art by teaching a framework reactive search facility (alternatively referred to herein as SF) for searching a data store for relevant information. Within the present context, relevancy is defined herein to be the characteristic of information that pertains to the degree of usefulness for the intended purpose of a searcher.

Those skilled in the art will recognize, however, that the teaching contained herein may be applied to embodiments and variations not shown and that the present invention may be practiced apart from the specific details taught herein. Accordingly, the present invention should not be limited to the embodiments shown but is to be accorded the widest scope consistent with the principles and features described herein. The following description is presented to enable one of ordinary skill in the art to make and use the present invention and is provided in the context of a patent application and its requirements.

Figure 1:
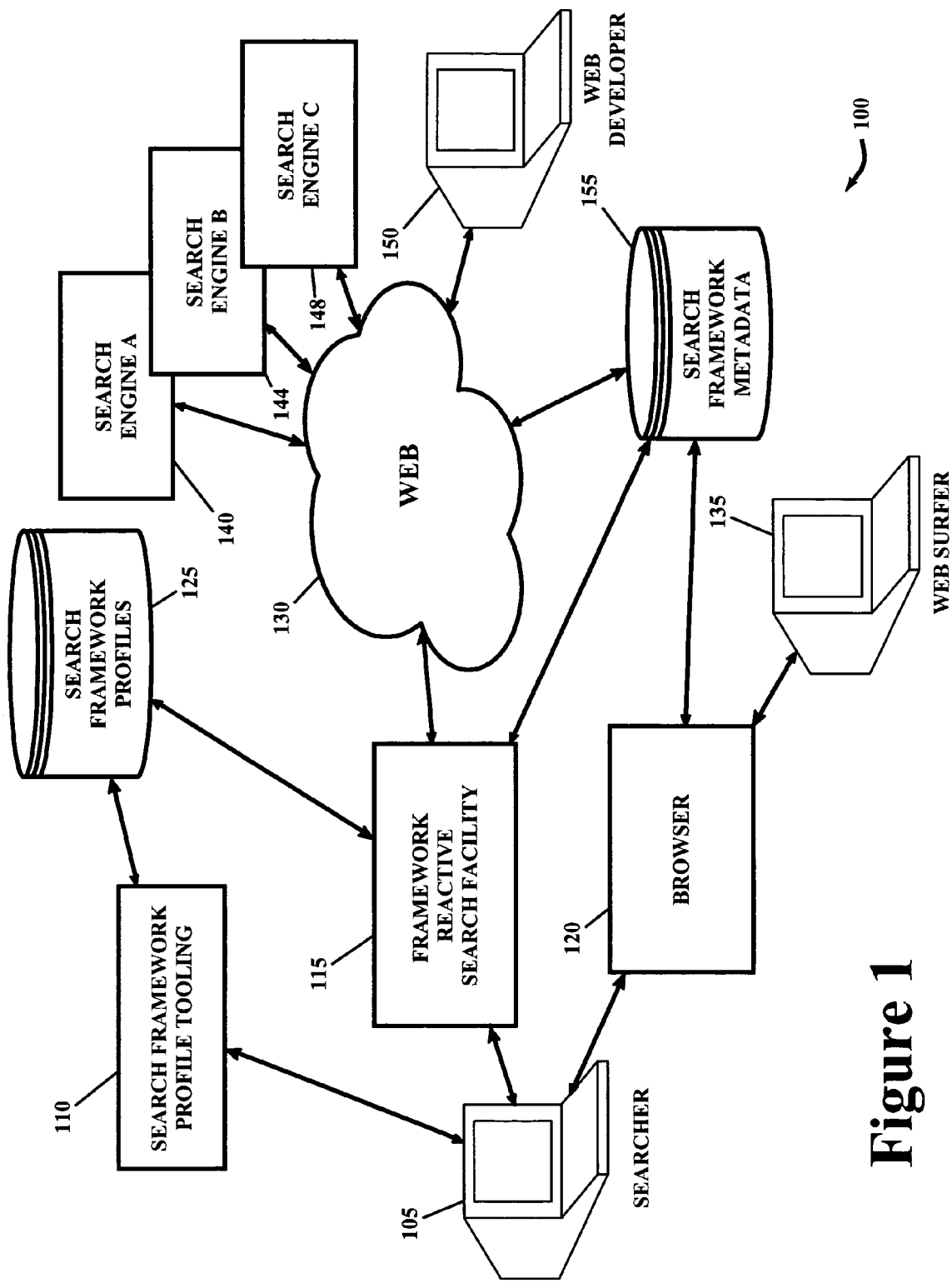
FIG. 1 is a high level block diagram illustrating major components of a preferred embodiment and operating environment for the present invention.

A brief overview of the present invention is now described in conjunction with block diagram 100 of FIG. 1, wherein the basic components of a preferred embodiment are illustrated. SF 115 receives a search request from a searcher utilizing workstation 105 to initiate her search. A search request specifies one or more search terms and optionally specifies a search framework profile (hereinafter referred to as an SFP). A search term is typically a search keyword, but may encompass other forms, such as an audio clip, an image, or any other entity that may have an occurrence within the data being searched.

An SFP is a named collection of non-topical data (i.e. data that is useful in directing a search facility to find relevant information, but where the non-topical data excludes the actual search terms to be used to direct a search). The name of the collection is the SFP name and is specifiable by a user to represent the named collection of non-topical search data to be used for a search operation. Searcher 105 utilizes SFP tooling 110 to generate or modify one or more SFPs in accordance with the needs of searcher 105. In various embodiments, SFP tooling 110 is in the form of an SFP Wizard to lead searcher 105 through an SFP definitional or modification process in a user friendly way that ensures accuracy and expediency.

If a symbolic reference to an SFP is specified, SF 115 searches repository 125 to locate and retrieve the matching SFP. Those of ordinary skill in the art will appreciate that a repository may be implemented in a variety of forms. Exemplary repository forms include computer files, databases, tables, control blocks and the like.

Utilizing web 130, SF invokes the services of one or more search engines 140, 144 or 148. SF 115 receives an accumulated set of search results (referred to herein as an accumulated result set) from the invoked search engines and ranks these results in accordance with the degree of affinity of each search result entity with a specified SFP. Those of ordinary skill in the art will appreciate that "ranking" means assigning an order of relative value to each search result entity with respect to the other search result entities in the accumulated result set.

For example, a relative ranking code may be assigned to each search result entity with a predetermined range, such as 1-100. Alternatively, the results may be ordered in accordance with their relative value; or, a combination of ordering and ranking codes may be utilized. In other various embodiments, search result entities may be dropped from the accumulated result set when the degree of affinity is below a threshold value. The resulting set, following the aforementioned ranking/pruning process, is referred to herein as the final result set.

The aforementioned ranking process is facilitated by the use of search framework metadata (hereinafter referred to as SFM), which is generated by other various processes described in greater detail infra. SFM is saved in repository 155 whenever it is generated, and subsequently may be used in the SF ranking process.

Exemplary processes generating SFM include direct input from a web page owner or web page developer 150, as well as evaluations from a web page viewer 135. Web page viewer 135 may be "surfing the web" utilizing browser 120. SFM may also be heuristically derived by utilizing browser 120 to observe how search results delivered to a searcher are subsequently used.

Those of ordinary skill in the art will recognize that FIG. 1 is exemplary in nature and is intended to instruct by showing an exemplary configuration for use with the present invention and, accordingly, its structure should not be limiting in any way. For example, in other various embodiments, SF internally incorporates one or more search engines and/or search engine functionality wherein search engines 140-148 are not accessed by SF 115. Alternatively, a search engine may be modified to incorporate the novel SF functionality disclosed herein.

Those of ordinary skill in the art will further recognize that use of web pages to illustrate the present invention are exemplary in nature. Other "units of information" in addition to web pages may be the target of intended search operations, such as computer files, text pages, paragraphs, chapters, objects and any other types of entities comprising related information known to exist or to become known at a future time.

Further still, those of ordinary skill in the art will recognize that use of the Internet to illustrate the present invention is exemplary in nature. Numerous other forms of searchable data stores are anticipated by the present invention and include such forms as computer memory, computer files, networks, intranets, databases, Network Attached Storage (NAS), Storage Area Networks (SANs), and, of course, the World Wide Web.

Additional detail is now presented to further augment the high level overview described above. Generally, the novel methods disclosed herein may be provided as a computer system or tangibly embodied in and/or readable from a computer-readable medium containing the program code (or alternatively, computer instructions), which when read and executed by a computer system, or processor, causes the computer system, or processor, to perform the steps necessary to implement and/or use the present invention.

Thus, the present invention may be implemented as a method, a system, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive, electronic memory and the like, as well as other non-palpable physical media such as a carrier signal, whether over wires or wireless, when the program is distributed electronically.

Figure 2:
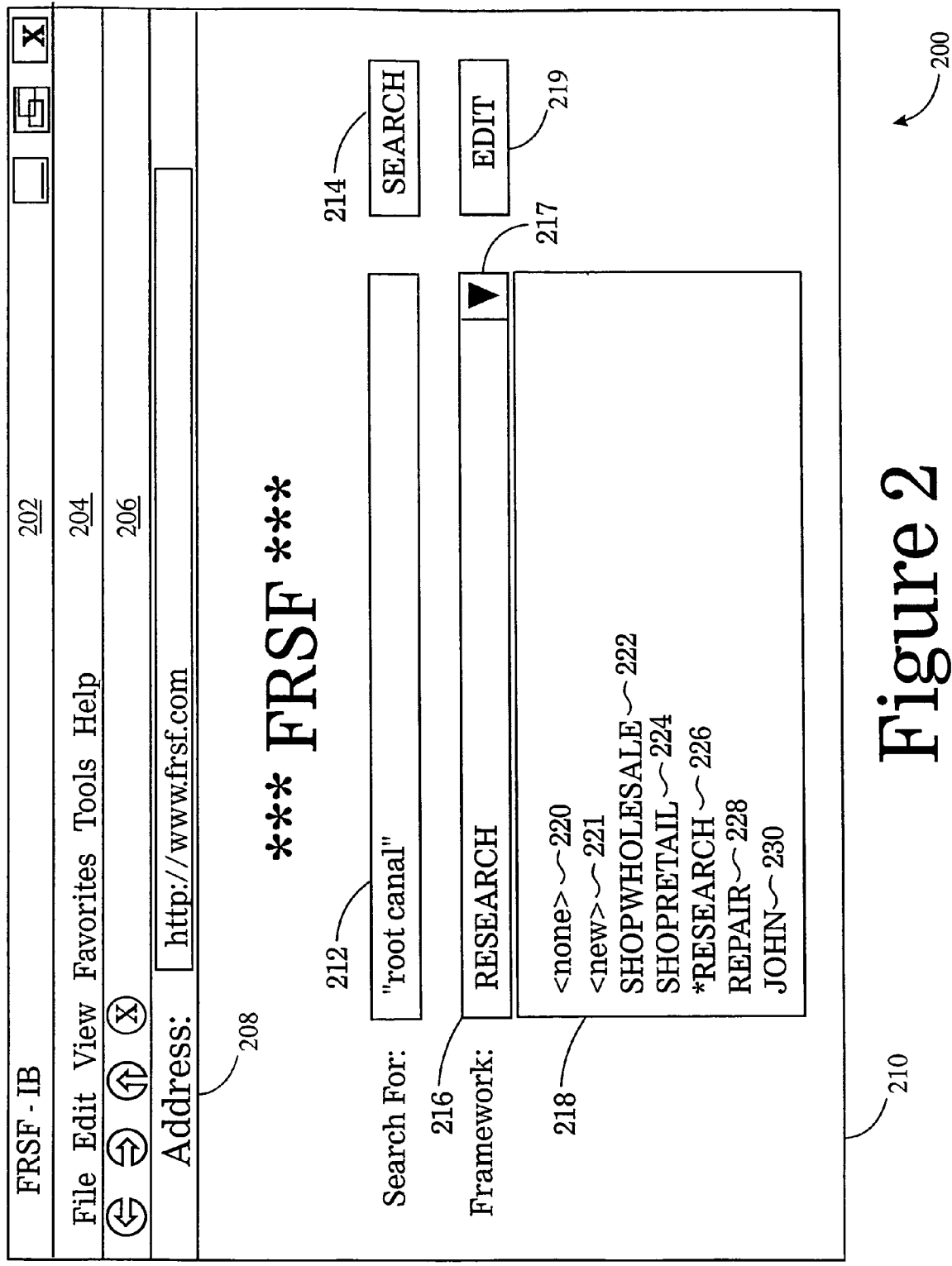
FIG. 2 illustrates an exemplary user interface window for performing a search in accordance with the present invention.

Referring now to FIG. 2, Internet browser window 200 illustrates an exemplary user interface for one embodiment of SF. Window portion 202 comprises the name of the current application followed by a hyphen and then the name of the Internet browser. For exemplary purposes, FRSF is arbitrarily selected to represent the name of the SF application and, also in an arbitrary manner, 11B represents the name of the Internet browser. Window portion 202 further comprises various window functions, such as minimize, resize and close. Window functions are not further explained here, as their operations are familiar to those of ordinary skill in the art.

Window portion 204 comprises various drop down menus that are typically present with known browser technology as well as other windows based applications. These menus are not further explained here, as their operations are familiar to those of ordinary skill in the art. Window portion 206 comprises additional browser functions, such as directing the browser to revisit a previously viewed page. These functions are also known to those of ordinary skill in the art and, accordingly, are not further taught in the present disclosure. Window portion 208 is used by the user to enter a particular website address. Currently illustrated in Window portion 208 is the address http://www.frsf.com, the exemplary address of the exemplary SF search application occupying window portion 210.

Window portion 212 provides an area for the user to enter search keywords to direct SF to find information containing the designated search keywords. In the interest of simplifying the present disclosure, and without diminishing the full understanding of the present invention, search keyword area 212 is shown as a single field. It is well known by those of ordinary skill in the art that advanced keyword search fields may be used wherein multiple search keywords and/or search keyword fields may be used, together with various logical operators such as AND, OR, NOT, etc.

Window portion 216 provides an area for the user to specify the symbolic name of an SFP. In one embodiment, window portion 216 initially displays the symbolic name of the SFP used in the previous search; in another embodiment, a default SFP is initially displayed. The user may click on (the phrase "click on" or "click" is intended to also encompass any other means of computerized user selection techniques known, or to become known, by those with ordinary skill in the art) down arrow 217 to display a list of existing SFPs available for selection in window portion 218.

In a preferred embodiment, the SFPs displayed in window portion 218 include "<none>" 220 and "<new>" 221. When <none> 220 is selected, the SF search application displayed in window portion 210 is directed to perform the requested search without the use of an SFP, wherein non-topical specifications are not utilized to rank the search results. When <new> 221 is selected, the SF search application viewable in window portion 210 is directed to initiate an SFP Wizard to assist the user in the generation of a new SFP. The initiation can be immediate, or, in an alternative embodiment, the SFP Wizard can be launched upon depressing edit button 219 or search button 214.

Window portion 218 also includes the display of all user defined SFPs currently existing. In the present example, SHOPWHOLESALE 222, SHOPRETAIL 224, RESEARCH 226, REPAIR 228 and JOHN 230 represent the set of exemplary SFPs previously created by the searcher. The names of the SFPs may be chosen by the searcher to facilitate recalling the appropriate SFP for the search task at hand. For example, the dentist, briefly mentioned above, may select RESEARCH 226 when searching for web pages containing keywords "root canal". By simply selecting RESEARCH 226, the dentist is able to utilize a comprehensive specification of all non-topical search characteristics previously constructed and proven useful for other research oriented search requests.

In another example, our dentist may select JOHN 230 as an appropriate SFP when searching for articles that may be useful for his pre-teen son's homework assignment. In a simple and effortless way, the searcher is able to specify comprehensive non-topical search characteristics with a single click for any type of searching task. This is a very powerful SF feature that may significantly enhance the accuracy of a search task in a very efficient manner.

In a preferred embodiment, by right clicking on a displayed SFP, a menu is displayed (not shown). One of the displayed menu options allows the user to specify that the particular right clicked SFP is to become the default SFP. An indicia is displayed next to the default SFP in window portion 218 to communicate to the user which of the SFPs is the current default. In a preferred embodiment, the default SFP is initially displayed in window area 216. In the present example, an "*" is used to designate the default and, as can be observed in window portion 218, RESEARCH 226 is the selected default SFP. Accordingly, "RESEARCH" is initially displayed in window portion 216. In a preferred embodiment, <NONE> 220 and <NEW> 221 may also be selected by the user as default SFP values.

In various alternative embodiments, an interface is provided (not shown) which allows a user to select a plurality of SFPs to be utilized with a single search request. For example, utilizing this feature, a searcher would be able to concurrently specify SHOPWHOLESALE 222 and SHOPRETAIL 224 for a single search of a hard to find item where simply finding the item was a higher priority than achieving a minimal cost transaction.

The user may optionally depress edit button 219 whereupon the SFP Wizard is initiated. In a preferred embodiment, no action is taken if edit button 219 is depressed with <none> 220 displayed in window portion 216. If <new> 221 is displayed in window portion 216, then the SFP Wizard is initiated in a form to accommodate the creation of a new SFP. If an existing SFP is specified in window portion 216, then the SFP Wizard is initiated in a form to accommodate the editing of the existing specified SFP. The user may depress search button 214 when she is ready to initiate the search task.

Those of ordinary skill in the art will recognize that FIG. 2 is exemplary and that various other interfaces may be deployed to communicate search keywords and non-topical search information to an SF.

Figure 3:
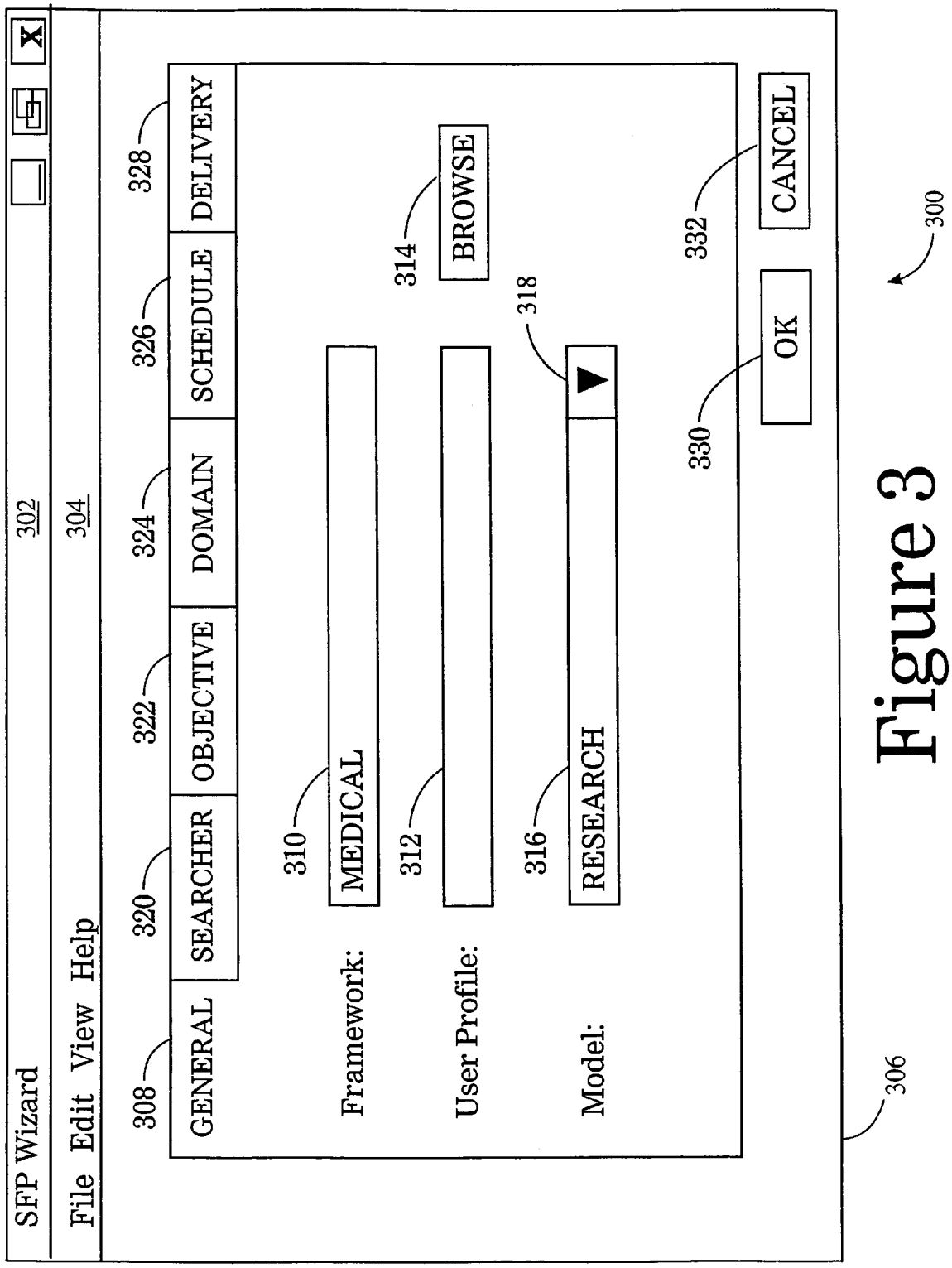
FIG. 3 illustrates an exemplary first SFP Wizard window in accordance with the present invention.

Referring now to FIG. 3, SFP Wizard window 300 appears on the user display responsive to a user interaction with the SF application, as discussed infra. Window portion 302 identifies the window as an SFP Wizard. Window portion 302 also comprises various window function icons, such as minimize, resize and close. Window portion 304 comprises exemplary drop down menus that may optionally be defined for use with the SFP Wizard. Exemplary functions available from these menus include viewing or editing additional SFPs and displaying help text. Since windows based applications frequently offer various selectable functions from these menus, and since their general use is well known by those of ordinary skill in the art, no further details are presented in the present disclosure.

Window portion 306 is the SFP Wizard dialog area where a user may define and/or edit a selected SFP. Window portion 308 facilitates user input for general orientation information, as indicated by the current tab name of "General". Window portion 310 provides an area for the user to enter an SFP name, or for the wizard to display an SFP name. If the user selected <new>, then window portion 310 allows the user to assign a symbolic name to the accumulated set of SFP information that will be generated within the current wizard session. If the user selected an SFP name for viewing or editing, then the selected SFP name is displayed by the wizard in window portion 310. Wizard window 300, as an example, shows window portion 310 containing exemplary SFP name "MEDICAL" as a new SFP.

Window portion 312 allows the user to optionally identify a user profile that may be used by the wizard to access relevant information for populating a subset of the characteristics for the present SFP. In one embodiment, window portion 312 may only be specified when the wizard is generating a new SFP. A user profile is one that was previously defined for an application other than an SF application, but because of standardization (e.g. XML tags,) relevant pieces of information are accessible by the wizard. Browse button 314 may be clicked on by the user to open a dialog box (not shown) wherein the user may search her computer files for a suitable profile to be selected. In other various embodiments, window portion 312 does not exist.

Window portion 316 provides an area for the user to enter the name of an SFP to be used as a model for populating the new SFP currently being defined. Wizard window 300, as an example, shows window portion 316 containing exemplary SFP name "RESEARCH" to be used as a model from which information is used to populate the new "MEDICAL" SFP currently being defined. Window portion 318 displays a down arrow icon signifying that the user may click on this icon to generate a drop down list (not shown) of all SFPs currently available for selection. As previously discussed, repository 125 of FIG. 1 contains all currently defined SFPs available to the user.

Eventually, when all intended non-topical search characteristics are specified, the user may click on OK button 330 to finalize the current wizard generated SFP and save it in repository 125 of FIG. 1. However, the user may also discard all of the specifications made during the current wizard session by clicking on CANCEL button 332. Those of ordinary skill in the art will recognize that wizard window 300 is exemplary and that other information of a general nature pertaining to creating an SFP could be included or substituted in wizard window 300.

Figure 4:
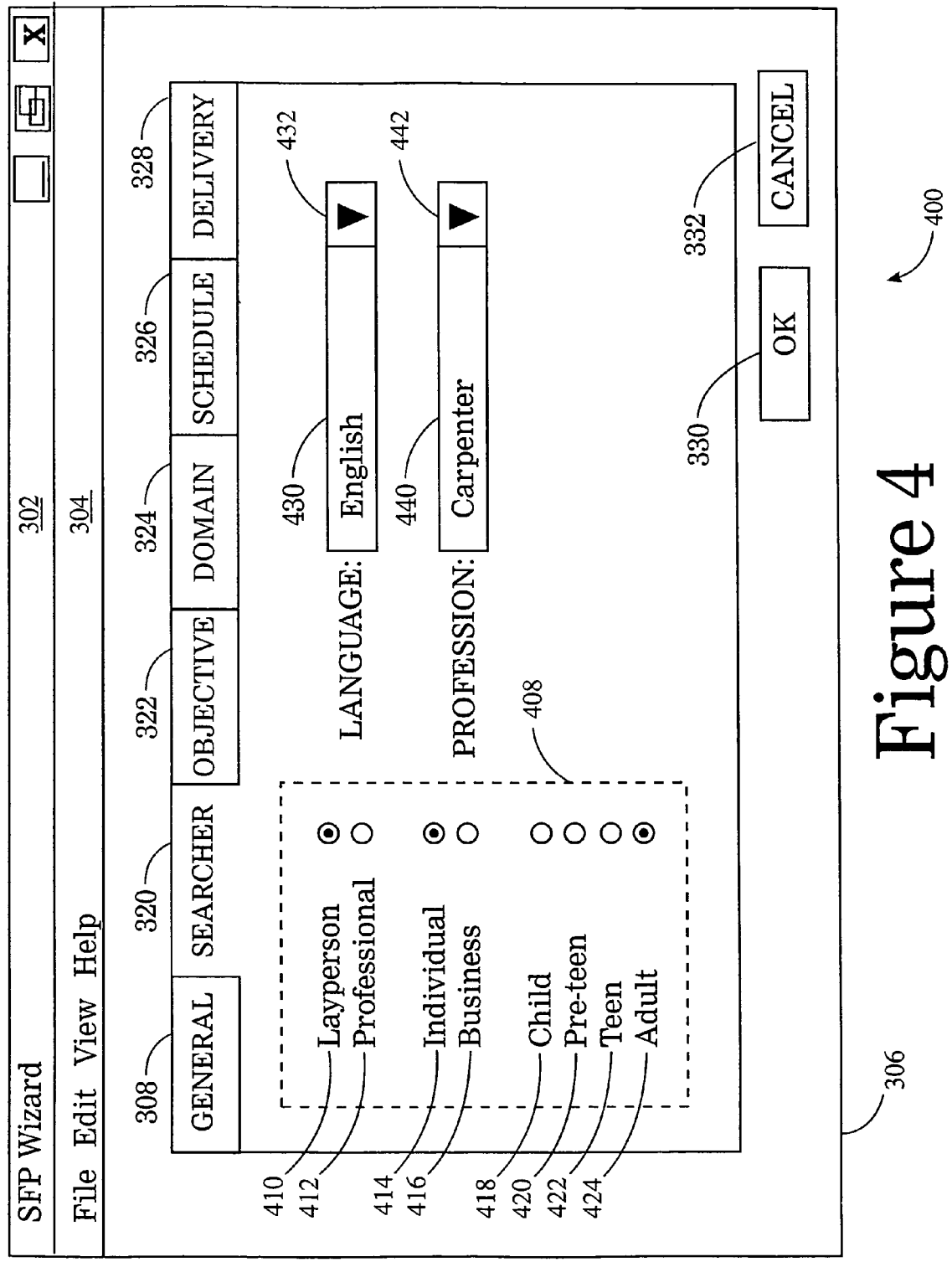
FIG. 4 illustrates an exemplary second SFP Wizard window in accordance with the present invention.

Referring now to FIG. 4, the user may click on tab 320 to enter non-topical search information pertaining to characteristics defining who the searcher is. Upon clicking tab 320, exemplary wizard window 400 is displayed. Window portion 408 comprises a plurality of sets of mutually exclusive personal characteristics with associated radio buttons. Those of ordinary skill in the art will recognize that "radio buttons" are commonly used to present a user with a plurality of choices where only one item from a list of items may be selected. The first set comprises Layperson 410 and Professional 412. Layperson 410 is shown as selected in the present example. If, however, a user was intending to define the SFP to be used in searching for a level of information deemed useful to a skilled professional, then Professional 412 may be selected and would likely be the better choice.

The next set of personal characteristics comprises Individual 414 and Business 416. Individual 414 is shown as selected in the present example. If, however, a user was searching for information as an employee or representative of a particular business, then Business 416 may be selected and would likely be the better choice.

The third set of exemplary personal characteristics comprises Child 418, Pre-teen 420, Teen 422 and Adult 424. Adult 424 is shown as selected in the present example. If, for example, the user was pre-teen, then Pre-teen 420 may be selected to more accurately communicate the age group of the searcher to the SF.

In other various embodiments some or all of personal characteristics 408 may utilize "check boxes" for their selection. Those of ordinary skill in the art will recognize that "check boxes" are commonly used to select one or more characteristics from a set of characteristics. In this embodiment a user, for example, could select Layperson 410 and Professional 412 or she could also select both Teen 422 and Pre-teen 420.

Continuing with FIG. 4, window portion 430 comprises a language preference specification. "English" is shown as the preferred language in the present example. The user may click on down arrow 432 to display a list (not shown) of language choices from which the user may select. Window portion 440 comprises a user's profession. "Carpenter" is shown as the user's profession in the present example. The user may click on down arrow 442 to display a list (not shown) of professions from which the user may select.

Those of ordinary skill in the art will recognize that wizard window 400 is exemplary and that other information pertaining to personal characteristics relevant to creating an SFP could be included or substituted in wizard window 400. Furthermore, those of ordinary skill in the art will recognize that while the term "searcher" is frequently the user that is performing the search, it is really referring to characteristics of the person for whom the search results are intended. Accordingly, as an example, a professional searcher would typically not describe her personal characteristics, but rather the personal characteristics for the intended audience of the search results.

Figure 5:
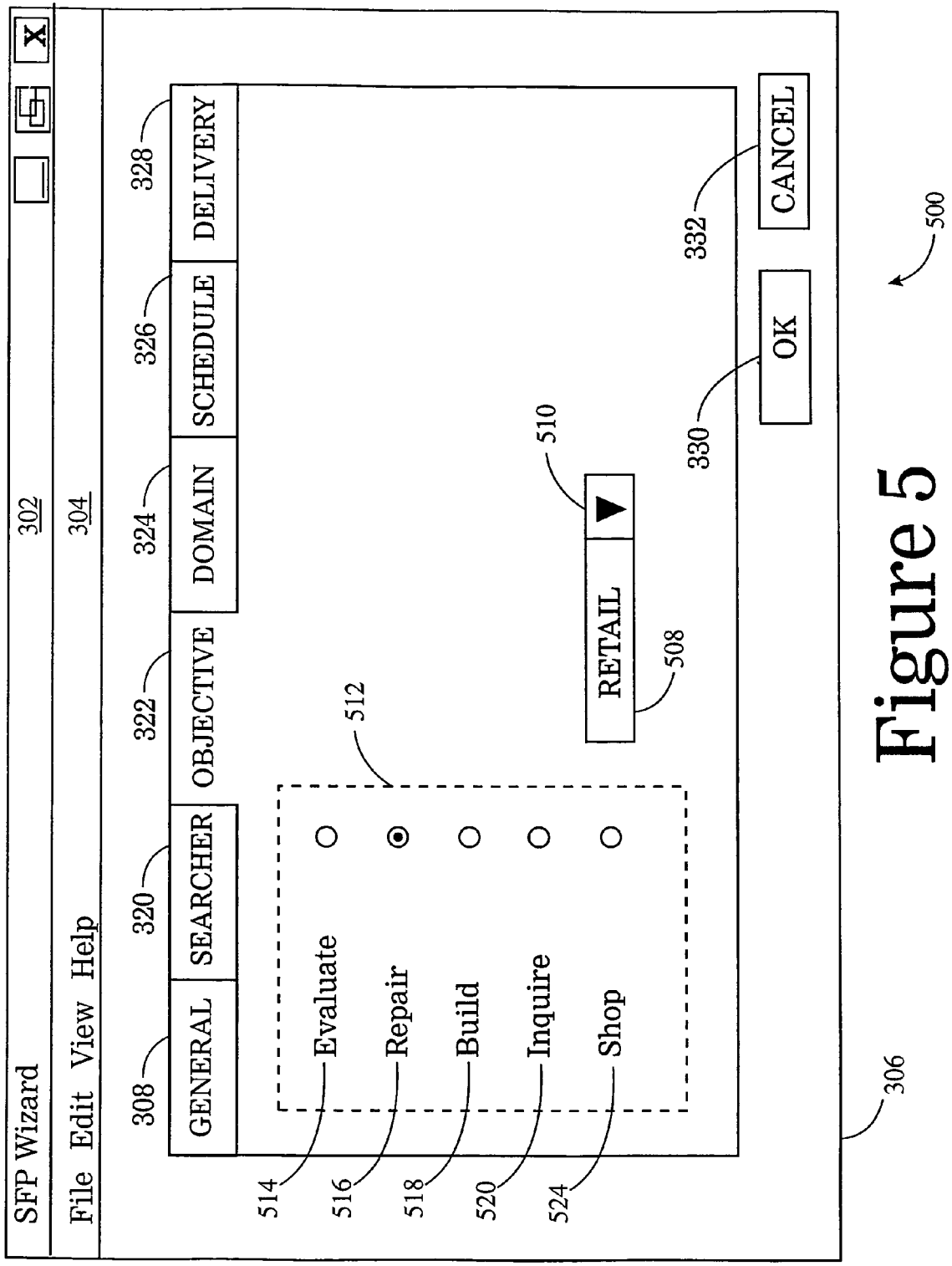
FIG. 5 illustrates an exemplary third SFP Wizard window in accordance with the present invention.

Referring now to FIG. 5, the user may click on tab 322 to enter non-topical search information pertaining to the search objectives. Upon clicking tab 322, exemplary wizard window 500 is displayed. Window portion 512 comprises a set of mutually exclusive search objectives with associated radio buttons. Set 512 comprises Evaluate 514, Repair 516, Build 518, Inquire 520 and Shop 524 as exemplary objectives that may be selected. Those of ordinary skill in the art will recognize that set 512 is exemplary and that any number of other search objectives may also be included.

If the user selects the radio button for Shop 524, then window portion 508 is activated wherein the user may optionally further specify the type of shopping. Initially, in a preferred embodiment, window portion 508 may contain the type of shopping most recently specified. The user may also click on down arrow 510 wherein a list (not shown) of available types of shopping is displayed for the user to select from. For example, the list may comprise retail, wholesale, and auction.

In the present example, Repair 516 has been selected as the search objective. This specification informs SF that the user is specifically looking for information that will help her to perform a repair operation. As further explained infra, this valuable information will be acted upon by SF to rank search results in accordance with the user's objective for finding the information.

Those of ordinary skill in the art will recognize that wizard window 500 is exemplary and that other information pertaining to search objectives relevant to creating an SFP could be included or substituted in wizard window 500.

Figure 6:
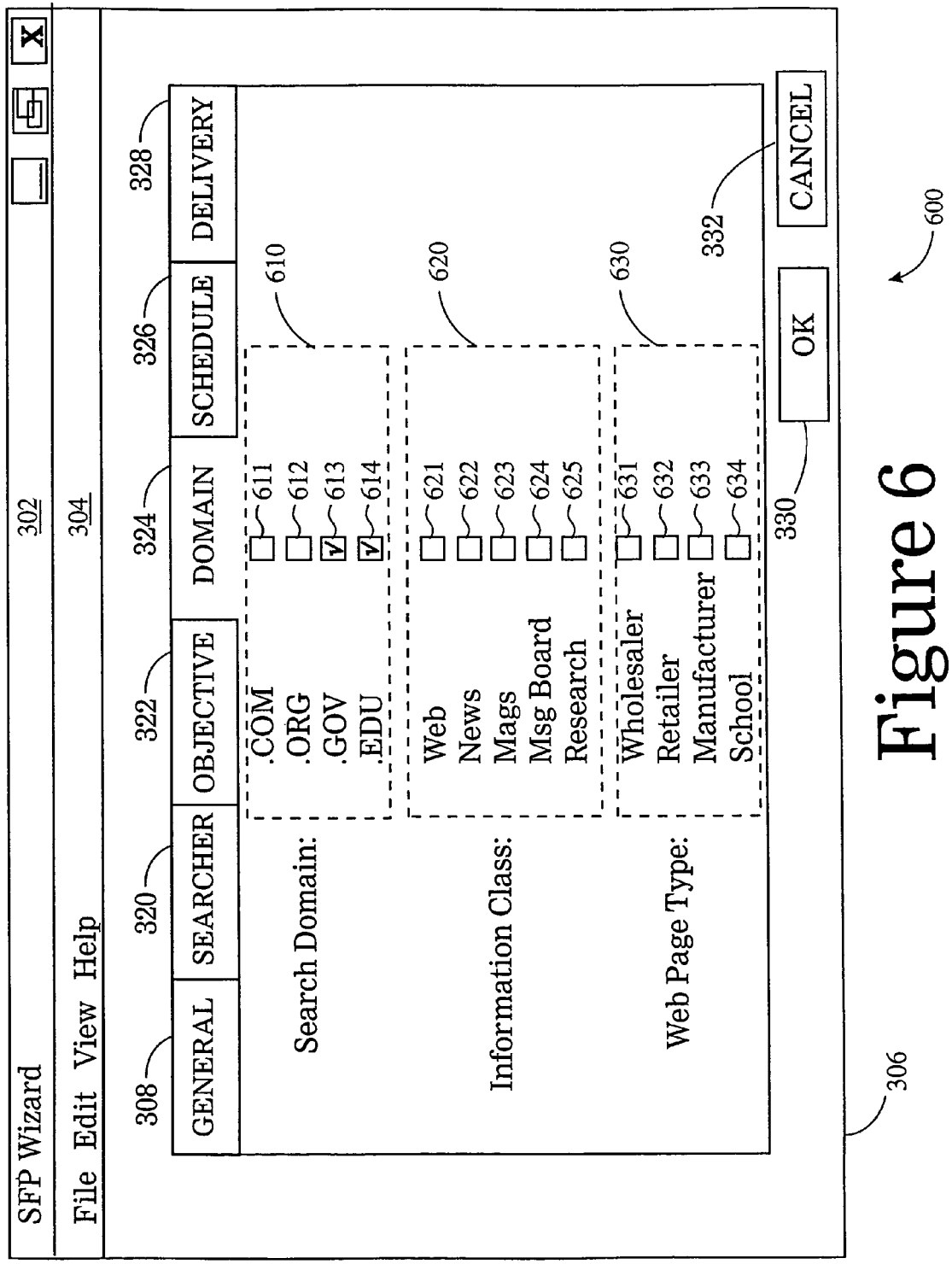
FIG. 6 illustrates an exemplary fourth SFP Wizard window in accordance with the present invention.

Referring now to FIG. 6, the user may click on tab 324 to enter non-topical search information pertaining to where SF should search for information. Upon clicking tab 324, exemplary wizard window 600 is displayed. Window portion 610 comprises search domain information wherein a user may direct SF to search only within the selected domains. Window portion 610, in a preferred embodiment, is presented in the form of "check boxes". Those of ordinary skill in the art will recognize that check boxes allow a user to make a plurality of selections and is not limited to just zero or one selection. In the present example, window portion 610 shows .gov domain 613 and .edu domain 614 as the selected domains in which SF is directed to search. Other exemplary check box choices shown in window portion 610 include .com 611 and .org 612.

Window portion 620 comprises information class choices. Exemplary choices, of which none or any number may be selected by a user, include web 621, news 622, magazine 623, message boards 624 and research papers 625.

Window portion 630 comprises web page type choices. Exemplary choices, of which none or any number may be selected by a user, include wholesaler 631, retailer 632, manufacturer 633 and school 634.

Those of ordinary skill in the art will recognize that FIG. 6 is exemplary and that its purpose is to show a representative selection of choices offered to a user wishing to direct SF to various sources of information in performing a requested search operation. Accordingly, other categories of information and numerous other choices within each category are anticipated by the present disclosure.

Figure 7:
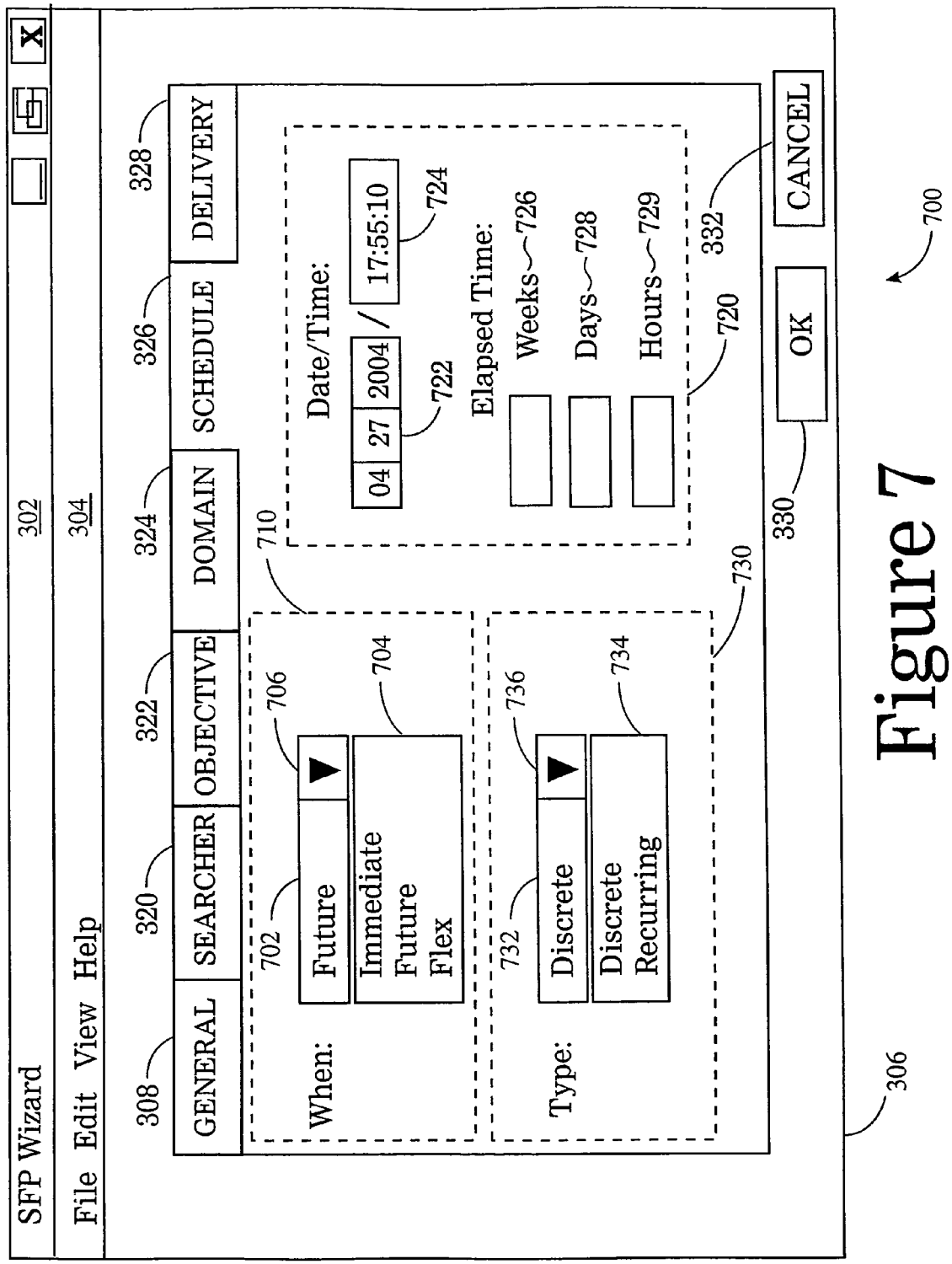
FIG. 7 illustrates an exemplary fifth SFP Wizard window in accordance with the present invention.

Referring now to FIG. 7, the user may click on tab 326 to enter search scheduling information directing SF in various aspects of search scheduling, as further described infra. Upon clicking tab 326, exemplary wizard window 700 is displayed. Window portion 710 comprises a drop down list of timing types that may be selected. Upon selecting "down arrow" 706, list 704 appears. In the present example, list 704 comprises the timing type choices of "Immediate", "Future" or "Flex". In the present example, the user has selected "Future" and, accordingly, the user's selection is displayed in window portion 702.

A selection of "Immediate" as a timing type directs SF to begin the search operation immediately. This is expected to be the most frequently used option and, accordingly, it is the default specification in a preferred embodiment. A selection of "Flex" as a timing type directs SF to begin the search operation at an off-peak time determined by SF to be particularly beneficial with respect to efficient use of computing resources. Furthermore, for a specification of "Flex", SF may break the search operation into various component sub-searches wherein each sub-search is scheduled in accordance with off peak times for the various servers involved with a particular sub-search component.

When the user selects a timing type of "Future", Window portion 720 is activated. In one embodiments, window portion 720 is activated in a dynamic way, generated responsive to the user's selection of "Future". In other various embodiments, window portion 720 is visually modified to reflect an inactive state and then, responsive to a user's selection of "Future", it is displayed in a normal appearance to reflect an active state ready to receive additional user input.

Window portion 720 comprises data entry windows 722-729 for inputting search timing information. Window portion 722 specifies a date on which a requested search operation will begin. Window portion 724 specifies a start time for a requested search operation. Alternatively, an elapsed time may be specified in lieu of an absolute date and time. An elapsed time reflects a specified period of time relative to the current date and time. Window portion 726 specifies an elapsed time period in units of weeks. Window portion 728 specifies an elapsed time in units of days. Window portion 729 specifies an elapsed time in units of hours. An elapsed time may be specified in any units of time including the above time units, or a combination thereof.

If the user selects "Immediate" from drop down list 704 within window portion 710, then window portion 720 is not relevant. In one embodiment, the user is inhibited from entering data in window portion 720 when "Immediate" has been selected. In an alternative embodiment, specifications within window portion 720 are ignored when the user selects "Immediate" from drop down list 704. In a preferred embodiment, if "Future" is selected from drop down list 704, window portion 720 may optionally be left empty, wherein the SF may schedule the search operation at a time determined by SF to utilize computing resources in an efficient manner. In an alternative embodiment when "Future" is selected, the SFP Wizard monitors the user's data entry and forces the user to make a specification as to when the search operation should be performed prior to exiting panel 326.

Window portion 730 comprises a drop down list of search types that may be selected by the user. Upon selecting down arrow 736, drop down list 734 appears. In the present example, drop down list 734 comprises the choices of "Discrete" or "Recurring". The user's selection is shown in window portion 732 which, in the present example, is "Discrete".

If the user selects "Recurring" from drop down list 734, then an input area (not shown) is provided for the user to enter timing information to define the intervals between the recurring searches. This input area may be similar to window portion 720, discussed supra, or may take other forms.

Those of ordinary skill in the art will recognize that SFP Wizard window 700 is exemplary in nature and that other types of search scheduling information may be included therein or included types may be excluded therefrom. For example, in other embodiments, calendars and clocks may be utilized wherein clicking on various dates and times provides a helpful and user-friendly interface for data entry. Therefore, these and numerous other types of user interfaces, known now or to become known in the future, are anticipated by the present disclosure.

Figure 8:
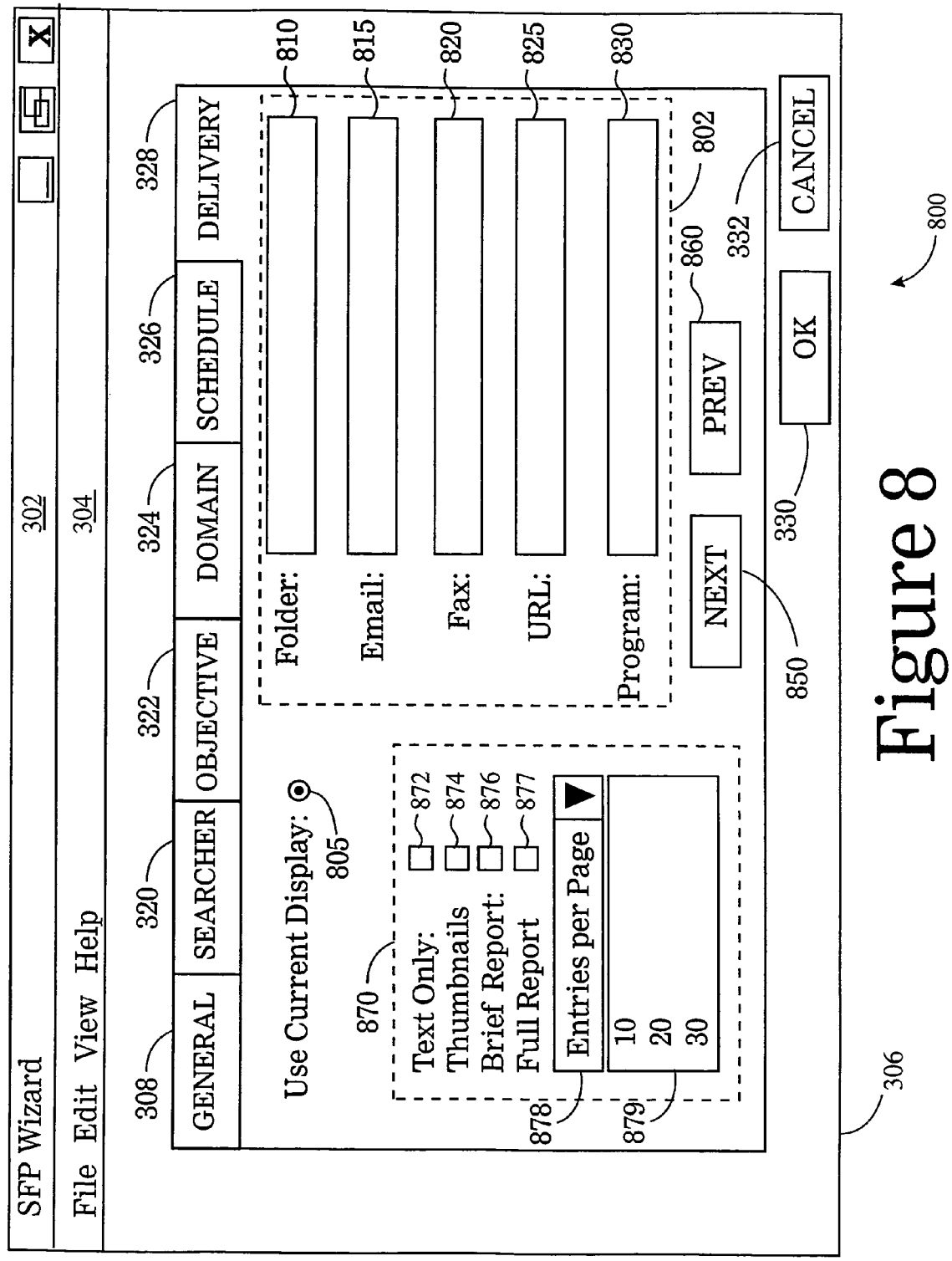
FIG. 8 illustrates an exemplary sixth SFP Wizard window in accordance with the present invention.

Referring now to FIG. 8, the user may click on tab 328 to enter search delivery information directing SF in various aspects of search delivery, as further described infra. Upon clicking tab 328, exemplary wizard window 800 is displayed. Window portion 802 comprises information directing SF as to a designated destination address and designated form for delivering search results. Window portion 802 may be utilized for designating a plurality of recipients and/or destinations together with a corresponding designated form for each by utilizing NEXT button 850. Upon clicking NEXT button 850, the currently displayed window portion 802 is refreshed with a new empty window portion 802. Upon completing a currently displayed window portion 802, NEXT button 850 may once again be clicked on in accordance with the number of recipients and/or destinations to be specified. PREV button 860 facilitates returning to a previously designated recipient or destination.

More specifically, window portion 802 comprises window portions 810-830. Window portion 810 provides for specifying a folder designated to receive a file containing the search results. An exemplary folder specification may look like "C:\Search\Medical" wherein the search results are directed to be delivered to the folder named "Medical", residing in folder "Search", located on hard drive "C". In one embodiment, if folder "Medical" does not exist within folder "Search", then SF automatically creates folder "Medical" in existing folder "Search". In similar fashion, SF could also automatically create folder "Search" if it does not currently exist. In an alternative embodiment, an error condition could be generated if a designated folder for receiving search results does not exist.

Window portion 815 provides for specifying an email address designated to receive the search results. When an email address is specified, SF prepares the search results as an email transmission to be delivered over a network to the designated email address. Window portion 820 provides for specifying a fax number designating a particular fax machine for receiving search results. When a fax number is specified, SF prepares the search results for a fax transmission over a telecommunications facility and/or network.

Window portion 825 provides for specifying a URL address designating a particular web page as the repository for search results. When a URL address is specified, SF finds and modifies the specified web page with the current search results. In one embodiment, tags (such as XML tags) are used within the web page associated with the specified URL to designate the receiving location within the page, as well as other formatting options. In an alternative embodiment, tags may be utilized to redirect the search results to a different repository, such as an alternative web page or additional web page. In still other various embodiments, default locations and forms are used by SF wherein various tags are not required.

Window portion 830 provides for specifying a Program name to receive a data stream comprising search results. When a Program name is specified, SF invokes the designated program and passes the search results data stream as input to the program. In one embodiment, various program directories may be utilized by SF to determine the appropriate convention for passing the search result data stream. In other various embodiments, a default convention may be utilized for passing the search result data stream wherein the identified program conforms to the default convention. In still other various embodiments, window portion 830 further specifies (not shown) how the search results data stream is to be passed to the designated program.

Window portion 805 provides a radial button for indicating that the search results are to be displayed on the search requestor's computer display. Those of ordinary skill in the art will recognize that this specification reflects how most search results are delivered in prior art search engines. When the current display is selected, SF displays the search results in the requestor's computer display in a default format, or in a format otherwise specified in window portion 870.

Window portion 870 comprises specifications directing SF as to a designated form for delivery. More specifically, exemplary window portion 870 comprises check boxes 872-877 together with menu selection 878 and sub-selection 879. Check box 872 directs SF to display search results in a text only mode. Alternatively, check box 874 directs SF to display search results utilizing both text and thumbnails. Those of ordinary skill in the art will recognize that "thumbnails" refers to a miniature image representative of the particular web pages included in the search results.

Check box 876 directs SF to display search results wherein abbreviated descriptions of each result are utilized to maximize the number of results that may appear on a display concurrently. Alternatively, check box 877 directs SF to display search results wherein the focus is on a more complete description of each result without regard to minimizing the amount of space occupied on the display.

Menu choice 878 may be selected to specify the number of entries to comprise a page of search results. Upon selecting menu choice 878, a sub-selection menu 879 is displayed wherein a number may be chosen as the number of entries for each page. In the present example, window portion 879 displays three choices of 10, 20 or 30 entries per page.

Those of ordinary skill in the art will appreciate that the components of window portion 870 are exemplary, and that numerous other specifications for a designated form to be associated with a recipient or destination may be considered for inclusion. For example, window portion 870 may be modified wherein a user can request search results in a designated form of PDF format, Wordperfect format, HTML format etc.

Upon completion of entering all applicable data associated with tabs 308, 320, 322, 324, 326 and 328, the user may select OK button 330 to inform SF that data entry is complete for the current SFP being defined. Upon clicking OK button 330, SF saves the currently defined SFP to repository 125 of FIG. 1. Alternatively, the user may choose to click on Cancel button 332 wherein all entered data for the currently defined SFP is discarded and no updates are made to repository 125.

FIG. 8 is exemplary and is intended to illustrate user specifications at a conceptual level pertaining to delivering search results. Those of ordinary skill in the art will recognize that numerous other specifications may be included in FIG. 8, and those specifications included may be further altered or excluded from the present example without departing from the spirit and scope of the present invention.

Referring now to FIG. 20, relational database table 2000 illustrates an exemplary SFP wherein user data captured by the SFP Wizard is retained. In various embodiments, the table name is the name, or a derivative of the name, of the SFP as specified during its creation or as later modified. Column 2020 comprises the categories of information collected, corresponding to tabs 320, 322, 324, 326 and 328 of FIG. 3. In the specific example of table 2000, just three of the five preferred embodiment categories are represented, namely Searcher 320, Objective 322 and Domain 324.

Column 2040 comprises various sub-categories for each primary category. For example, table 2000, column 2040 subcategorizes SEARCHER into MODE, LEVEL, LANGUAGE and PROFESSION. Column 2060 refers to the information elements corresponding to the various categories and sub-categories of column 2020 and column 2040. Referring to FIG. 4, in conjunction with FIG. 20, it is apparent that the exemplary informational elements represented in the SFP Wizard graphical interface, such as Layperson 410, Professional 412, Individual 414, Business 416, Adult 424, English 430 and Carpenter 440 are accommodated in column 2060 of table 2000.

Column 2080 represents the specified data values for each of the information elements of column 2060. For example, once again using FIG. 4, it can be seen that the selection of the radial button associated with Layperson 410 is captured in table 2000 by the specification of "YES" in the row "SEARCHER MODE LAYPERSON YES". In like manner, all of the selections made with the SFP Wizard graphical interface for tabs 320, 322 and 324 are represented in exemplary relational table 2000. Other information elements and data values associated with tabs 326 and 328 are not included in exemplary table 2000 in the interest of simplicity. Those of ordinary skill in the art will appreciate that table 2000 will expand as necessary to accommodate all categories, sub-categories, information elements and data values specified by the user during an SFP Wizard session and will be in conformity with exemplary FIGS. 4 through 8.

In a preferred embodiment, SFM is accumulated for various units of information wherein SFM associated with a unit of information may be compared with SFP characteristics from a particular SFP in order to determine the degree of affinity between a unit of information containing a specified search keyword and a specified SFP.

In accordance with the present invention, a number of different schemas may be deployed for accumulating SFM. In a preferred embodiment, SFM may be accumulated by providing a method for a viewer of a unit of information to optionally provide an evaluation of the unit of information. Those of ordinary skill in the art will appreciate that a viewer of information is not necessarily deploying an associated search process. For example, a viewer may be one who is simply "surfing" the web and haphazardly stumbles across the information. Alternatively, the viewer may have the address of the unit of information and utilizes the known address to cause the unit of information to be displayed.

Figure 9:
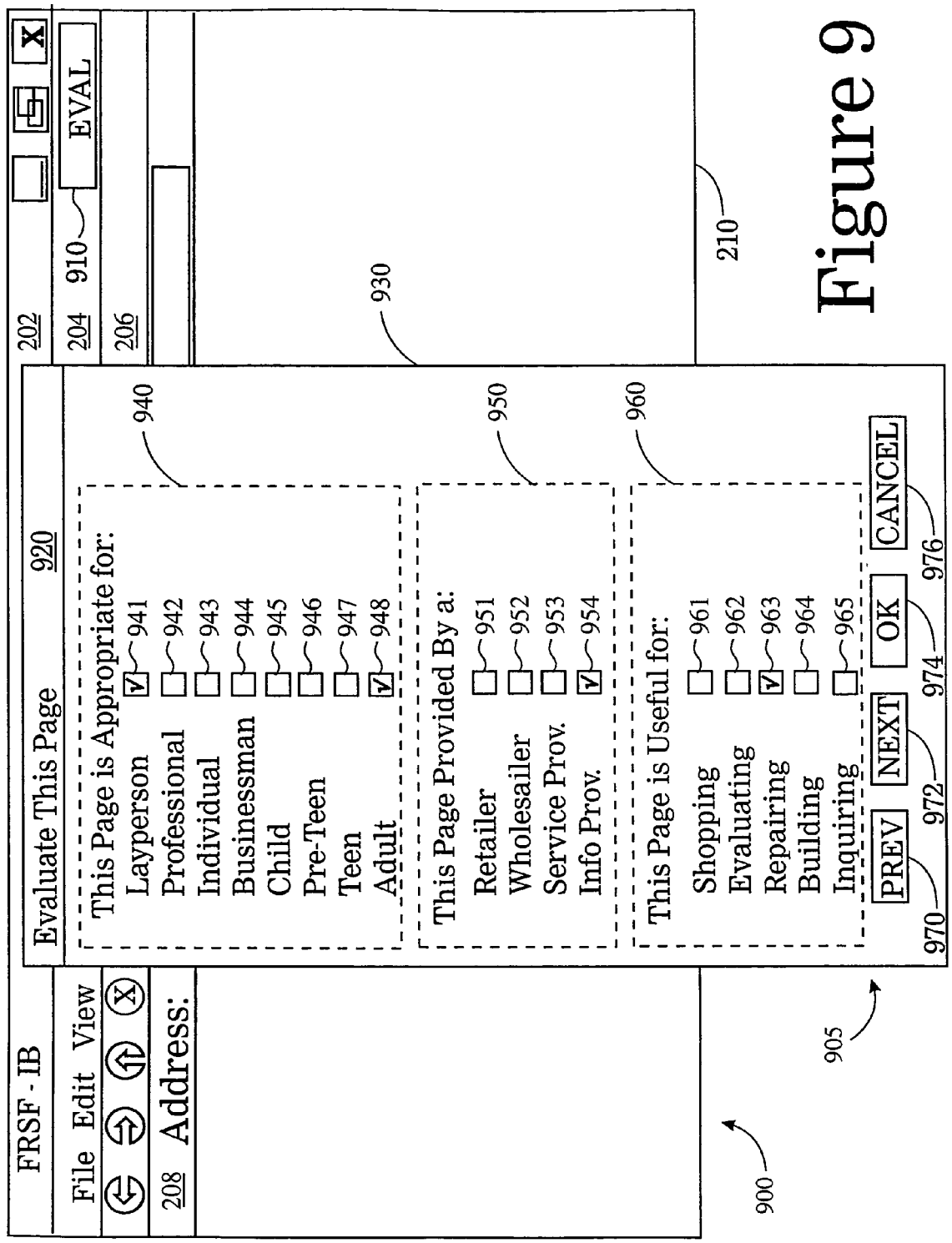
FIG. 9 illustrates an exemplary viewer evaluation page in accordance with the present invention.

Nevertheless, a viewer of a unit of information is in a position to contribute to the accumulation of SFM that can subsequently be utilized by SF in an effective manner. Referring now to FIG. 9, an example is shown to illustrate the accumulation of SFM from a viewer evaluation of a unit of information, wherein the unit of information is a web page. Browser window 900 is shown wherein an exemplary unit of information is available to a viewer within window portion 210. Window portion 208 contains a URL address identifying the address of the contents displayed in window portion 210 (the contents are not shown.)

EVAL button 910 may be optionally clicked on by the user, whereupon pop-up window 905 appears. Window 905 prompts a user to provide SFM for the unit of information displayed in window portion 210. The user may proceed to optionally enter responses to any or all of the prompts in window 905. The various user responses are transformed by the browser into SFM form and saved in repository 155 of FIG. 1.

Those of ordinary skill in the art will recognize that FIG. 9 is an exemplary embodiment applicable to web pages and the world wide web. The present invention is applicable to numerous other environments wherein the browser represented by browser window 900 may be any application wherein a unit of information is being displayed. Furthermore, EVAL button 910, is also exemplary, as will be appreciated by those of ordinary skill in the art. Many other methods for triggering the creation of pop-up window 905 are known in the art, or may become known, and all such methods of triggering a dynamic window creation are anticipated by the present invention.

Window portion 920 displays a title for window 905, which in the present example is "Evaluate This Page". Window portion 930 contains various user prompts for evaluation information comprising window portions 940, 950 and 960.

Window portion 940 pertains to an evaluation of an appropriate audience for the web page currently displayed in window portion 210 (i.e. the web page associated with the URL address displayed in window portion 208.) More specifically, window portion 940 comprises a series of exemplary check boxes 941-948. In the present example, Layperson 941 and Adult 948 are checked by the user to indicate that, in her opinion, the displayed web page is most appropriate for an adult layperson.

Alternatively, check box 942, Professional, could be selected by a user in place of check box 941 or in addition to check box 941, in accordance with the user's opinions about the suitability of material for selected audiences.

Those of ordinary skill in the art will appreciate that numerous other check boxes may be provided, modified or eliminated from exemplary window portion 940. Continuing with window portion 950, the viewer may communicate an opinion about the provider of the web page being viewed. More specifically window portion 950 comprises a series of exemplary check boxes 951-954. In the present example, Information Provider 954 is checked by the viewer as the most likely provider of the displayed web page.

Those of ordinary skill in the art will appreciate that numerous other check boxes may be provided, modified or eliminated from exemplary window portion 950. Continuing with window portion 960, the viewer may communicate an opinion about a likely use for the displayed web page. More specifically, window portion 960 comprises a series of exemplary check boxes 961-965. In the present example, Repairing 963 is checked by the viewer as a likely use for the displayed web page.

Those of ordinary skill in the art will appreciate that numerous other check boxes may be provided, modified or eliminated from exemplary window portion 960. Additionally, other categories of check boxes may be provided to a viewer for selection (not shown) in accordance with the present invention. If more check boxes are defined that conveniently fit in pop-up window 905, a PREVIOUS button 970 and NEXT button 972 may be defined, wherein additional pages of check boxes may be navigated by the user. Alternatively, in various embodiments a scrolling function could be utilized to navigate through the defined set of check boxes.

When the viewer completes her evaluation of the web page displayed in window portion 210 by selecting any of the applicable check boxes available in window portions 940, 950 and 960, the viewer may then click on OK button 974 to save the evaluation. Alternatively, the viewer may click on CANCEL button 976 to terminate the evaluation at any time, wherein the information represented by the checked boxes is discarded. In various other embodiments, window portions 940, 950 and 960 may comprise radial buttons, drop down lists, data input fields, check boxes or any combination thereof.

Furthermore, window 905 is provided as an exemplary evaluation opportunity wherein the viewer participates in the evaluation opportunity by providing evaluation information. Numerous other means for participating in an evaluation opportunity, known or to become known at a future time, are anticipated by the present invention. Exemplary other means include audio prompts, voice recognition, touch screens, and the like.

Figure 10:
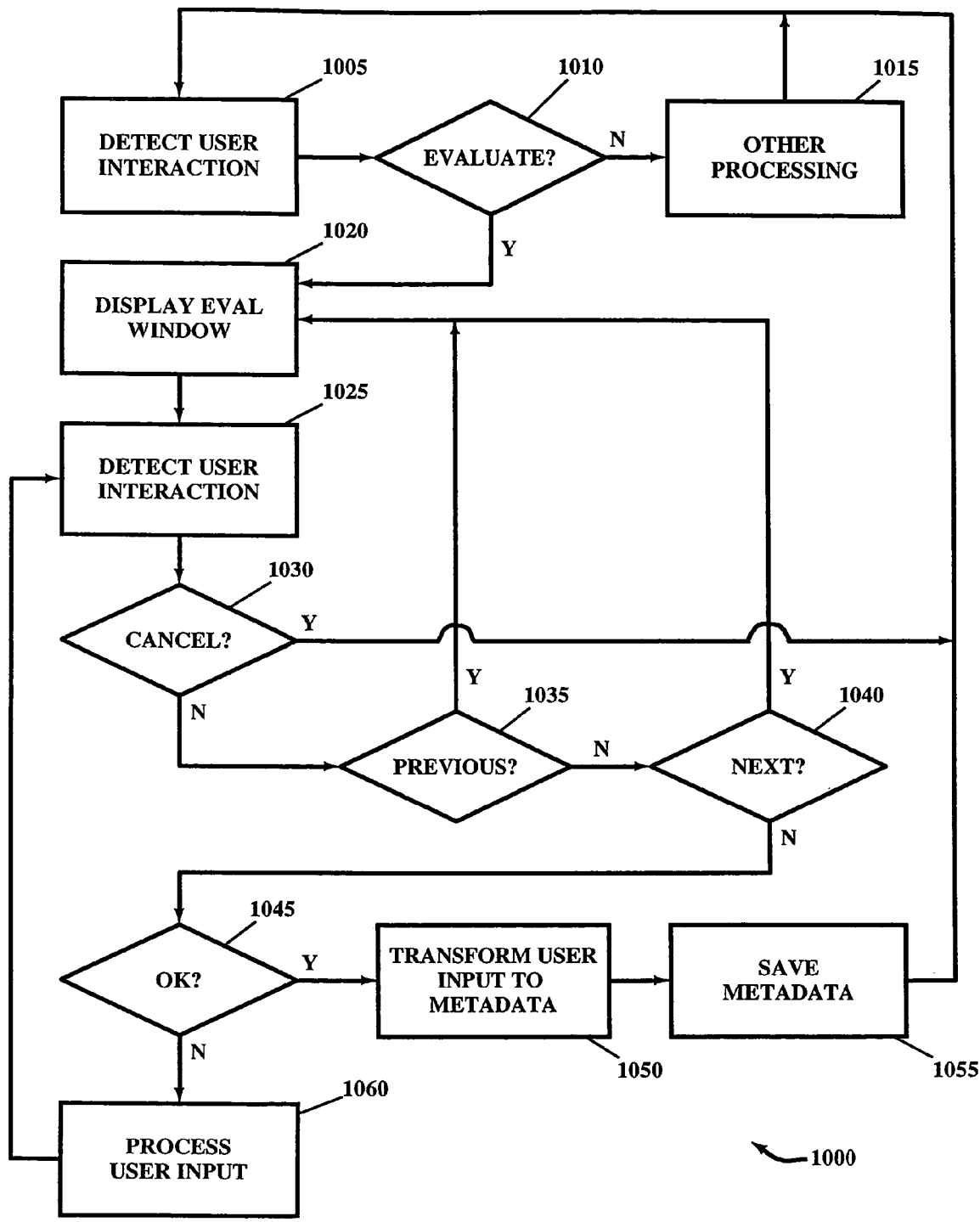
FIG. 10 is a flow diagram illustrating an exemplary logic flow for capturing search framework metadata from a viewer of a web page.

Referring now to FIG. 10, in combination with FIG. 9, flow diagram 1000 illustrates the program flow for one aspect of SFM collection pertaining to a viewer's evaluation of a unit of information. In step 1005 a user interaction is detected in conjunction with displaying a unit of information. In step 1010, a test is made to determine if the user interaction was a request to evaluate the displayed unit of information. In the example corresponding to FIG. 9, a request to evaluate is triggered by a user interaction with EVAL button 910 (e.g. clicking on button 910.)

If an evaluation request is not detected, then in step 1015, another process associated with the user interaction is performed and control returns to step 1005 to process a subsequent user interaction. If an evaluation request is detected, then control passes to step 1020 where an evaluation window is displayed to receive user input. In the example corresponding to FIG. 9, the displayed evaluation window is pop-up window 905.

Continuing with step 1025, a user interaction is detected in conjunction with the displayed evaluation window. In step 1030, a test is made to determine if the user interaction is the selection of the CANCEL function, wherein the current evaluation process is discontinued and processing returns to step 1005. If the user interaction is not for the CANCEL function, control passes to step 1035 wherein a test is made to determine if the user interaction is the selection of the PREVIOUS function. The CANCEL function and PREVIOUS function correspond to CANCEL button 976 and PREVIOUS button 970 in the example of FIG. 9.

If the PREVIOUS function is selected, then control returns to step 1020 where the evaluation window is re-displayed with previously displayed evaluation information. If there is no previously displayed evaluation information, then no processing occurs at step 1020. If the PREVIOUS function was not selected, then control passes to step 1040 wherein a test is made to determine if the user interaction is the selection of the NEXT function.

If the NEXT function is selected, then control returns to step 1020 where the evaluation window is re-displayed with the next to be displayed evaluation information. If the last of the evaluation information is currently displayed, then no processing occurs at step 1020. If the NEXT function was not selected, then control passes to step 1045 wherein a test is made to determine if the user interaction is the selection of the OK function. The NEXT function and the OK function correspond to the NEXT button 972 and the OK button 974 in the example of FIG. 9.

If the OK function has been selected, then control passes to step 1050 where all user input is transformed into SFM. The SFM is then saved in a repository (such as repository 155 of FIG. 1), in step 1055, and associated with the unit of information corresponding to the user's evaluation request. In various embodiments, the transformation of user input into SFM is accomplished by calculating a relative strength percentage for those SFP characteristics receiving a positive indication within the user's evaluation. For example, a counter representing the total number of evaluations performed for a unit of information is maintained along with a second counter representing the number of evaluations indicating positive support for a particular SFP characteristic within the unit of information. The relative strength percentage for the SFP characteristic is computed by dividing the second counter (number of positive evaluations) by the first counter (total number of evaluations performed.)

In various embodiments locking protocols, known to those of ordinary skill in the art, are utilized to ensure the integrity of SFM in environments supporting concurrent evaluations of a given unit of information. Control then returns to step 1005. Those of ordinary skill in the art will appreciate that SFM may be represented by numerous different forms. Exemplary forms utilizing counters for SFM are further explained infra.

Returning now to step 1045, if the OK function is not selected, then the user interaction must be for evaluation input and, accordingly, control passes to step 1060 to process the user interaction. In the example associated with FIG. 9, a user interaction representing evaluation input comprises the selection of a check box from window portions 940, 950 or 960, whereupon a check is displayed in the associated box as visual feedback to the user. Upon completing the processing associated with the user's evaluation input, control returns to step 1025 where a subsequent user interaction may be processed.

In various embodiments, SFM may also be accumulated by receiving information directly from the developer or owner of a unit of information. In a preferred embodiment, direct input from the owner or developer of a unit of information may be used in combination with evaluation SFM described supra.

In various embodiments tags (e.g. HTML tags or XML tags) are standardized to define certain predefined SFM. In this way a website developer, for example, may specify various search framework characteristics of a web page. This tag may be a hierarchical specification such that a search framework tag deployed at the homepage level automatically propagates to each page within the website. In a preferred embodiment, such hierarchical propagation may be overridden by a specific tag specification for specific web pages within the website hierarchy.

Alternatively, the hierarchical propagation may occur from any designated web page from within the website wherein each web page lower in the website hierarchy automatically receives the tag, unless it is explicitly overridden by a tag definition. In various embodiments, search framework tags may only be specified at the homepage level. In a preferred embodiment, the tag is self-defining as to whether or not it is a hierarchical tag.

For example, a standardized tag may take the form of <primeuse> wherein a web page developer may insert the text "<primeuse> shopretail (90%) producteval (60%)</primeuse>" to communicate to an interested search facility utilizing standardized tags and keywords that the intended primary use of the web page was for retail shopping and for product evaluation. Further specified in this example is an indication of relative strength percentages for each keyword. In like manner, numerous other standardized search framework tags may be defined to include some or all of the exemplary characteristics previously disclosed in conjunction with FIG. 9, or any other characteristics deemed to be useful to an SF search facility.

Figure 11:
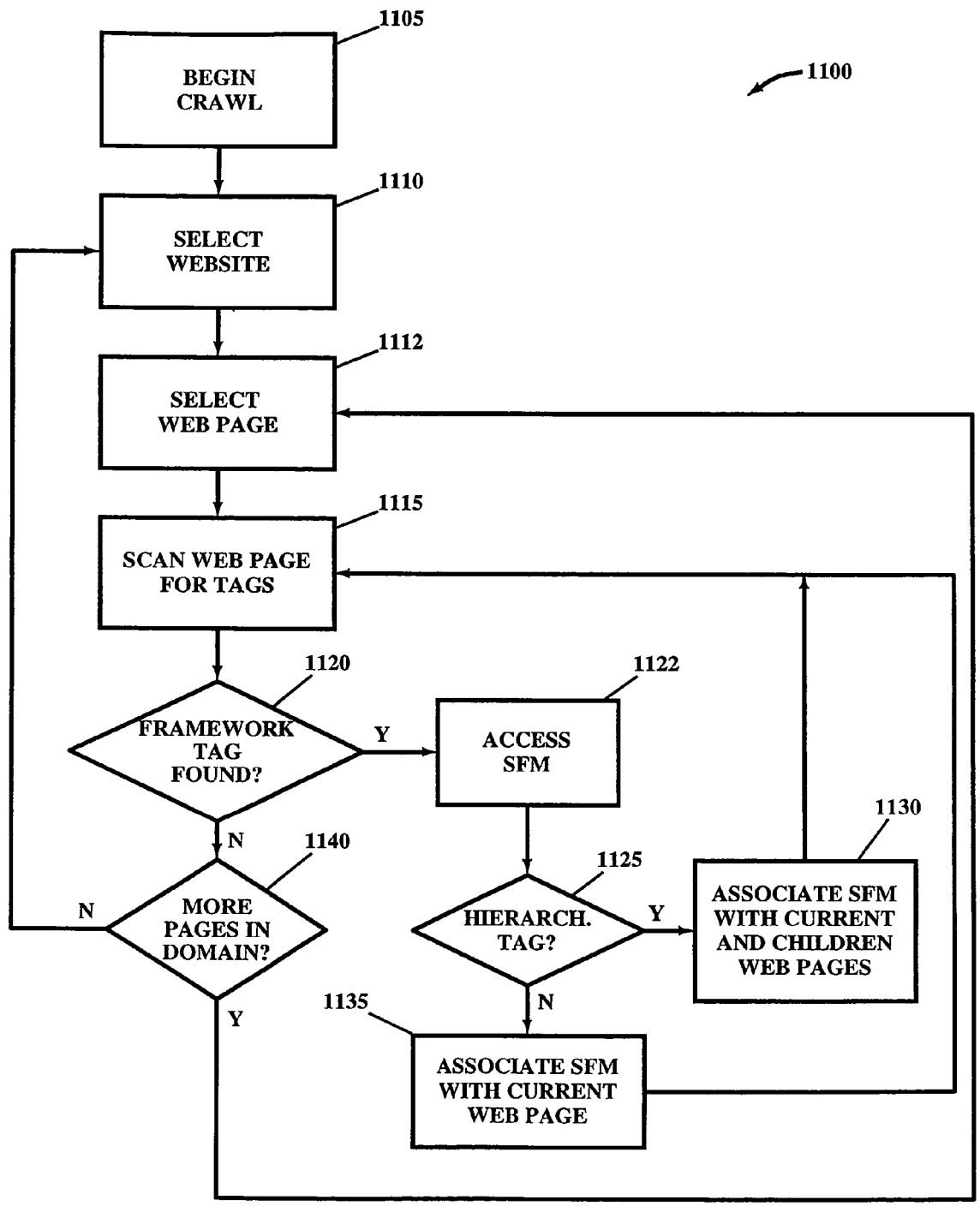
FIG. 11 is a flow diagram illustrating an exemplary logic flow for accumulating search framework metadata from a search framework metadata crawler.

Referring now to FIG. 11 flow diagram 1100 illustrates an exemplary program flow for one aspect of SFM collection pertaining to receiving information directly from a developer or owner of a unit of information. In step 1105, a web crawler process begins. Those of ordinary skill in the art will recognize that, in various embodiments, a web crawler process may run continuously as a background computing task. In step 1110, a website is selected from which to access information associated with search framework tags. Continuing with step 1112, a first or next web page from the website is selected. Then, in step 1115, the selected web page is scanned. A test is made in step 1120 to determine if a search framework tag was found in the web page.

If a search framework tag was not found, then control passes to step 1140 where a further test is made to determine if more web pages need to be scanned for search framework tags. Otherwise, a search framework tag was found and control passes to step 1122 to capture SFM associated with the found SFM tags. The term "capture", as used herein, means to extract, copy or otherwise gain access to the SFM associated with the found tag. Then, in step 1125, a test is made to determine if the search framework tag is hierarchical. If so, then in step 1130, the associated SFM is associated with the current web page and all child web pages void of explicit conflicting tags within the current domain. Control then passes to step 1115 to scan for additional search framework tags.

Returning now to step 1125, if the found tag is not hierarchical, then in step 1135, the SFM from step 1122 is associated with the current web page. Control then passes to step 1115 to scan for additional search framework tags. In various embodiments, the SFM is saved in a repository, such as repository 155 of FIG. 1. In a preferred embodiment, the saved SFM comprises a relative strength percentage for each located search framework tag.

In various embodiments, SFM may also be accumulated by utilizing heuristic means. In a preferred embodiment, heuristically accumulated SFM is used in combination with evaluation SFM from a reviewer and SFM explicitly defined by a developer or web page owner. In other various embodiments, any combination of SFM classes (i.e. reviewer, developer/owner explicit and heuristic) may be accumulated and utilized by SF in processing a search request.

In obtaining SFM heuristically, the SFM is inferred from patterns related to the usage of returned search results. This is accomplished by establishing new communications between a browser and search facility. In this way, various patterns or thresholds can be used to infer a correlation between SFP characteristics used to obtain the returned final result set and a particular accessed web page. For example, the browser may send a time-stamped "event" record to SF identifying a particular web page that is being displayed to a user based upon the user's interaction with a returned final result set. A second time-stamped "event" record is sent to SF by the browser when the user returns to the final result set. If the elapsed time exceeds a predefined threshold, then SF may conclude a positive correlation between the web page selected from the final result set for viewing and the SFP characteristics utilized in performing the search that produced the final result set.

Each time a web page is accessed from a final result set, a counter associated with the web page is incremented by 1. Further, if the web page is also "sticky" (i.e. the time stamps indicated a user review duration in excess of a predetermined threshold), then a counter associated with each SFP characteristic used to include the web page in the final result set is incremented by 1.

For example, if a web page is accessed ten times, and is found to be "sticky" six times with respect to a particular SFP, then the associated SFP characteristics have a relative strength of 60%. It will be appreciated by those of ordinary skill in the art that, with a web page being included in numerous final result sets utilizing numerous different SFPs, that each standardized SFP characteristic will, over time, accumulate its own unique relative strength ratio with respect to a given web page.

In various other embodiments, in addition to usage patterns or in lieu of usage patterns, a SFM webcrawler component may be utilized to analyze web page content. The presence of various elements, or combinations of elements, may allow the SFM webcrawler to infer that some or all standardized SFP characteristics are likely present in a selected web page. In a preferred embodiment, SFM representing standardized SFP characteristics are represented as relative strength ratios in accordance with various algorithms used to detect the strength of the presence of SFP characteristics. In various other embodiments, a threshold may be deployed wherein a particular characteristic is deemed to be either present or not present.

Figure 12:
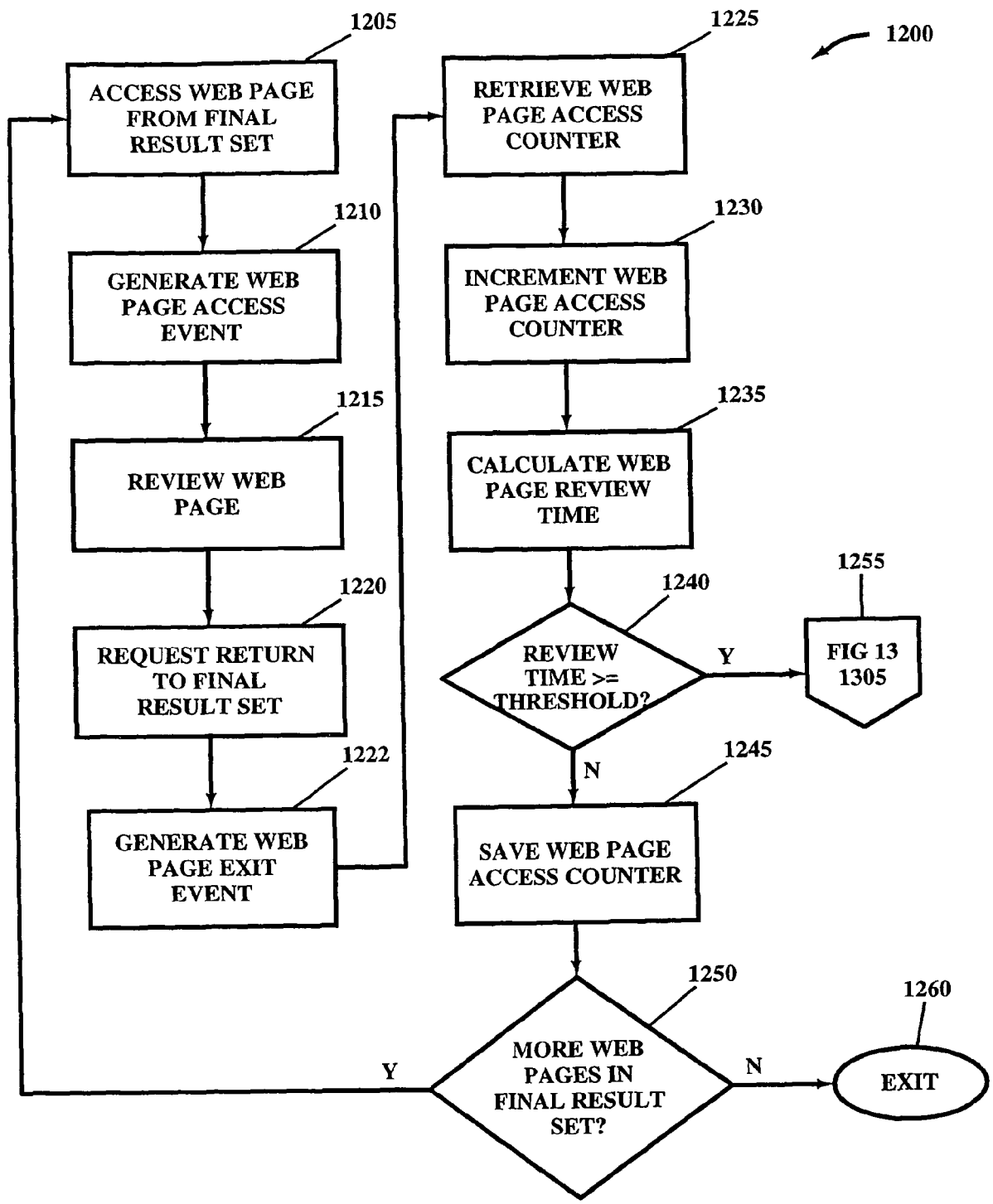
FIG. 12 is a flow diagram illustrating an exemplary logic flow for heuristic search framework metadata accumulation.

Referring now to FIG. 12 flow diagram 1200 illustrates an exemplary program flow for one aspect of SFM collection pertaining to heuristic derivation from observed usage patterns of units of information accessed from a final result list. More specifically, FIG. 12 illustrates an exemplary program flow within the context of the Internet.

In step 1205, a web page is accessed from a final result set. Those of ordinary skill in the art will appreciate that this is typically accomplished by clicking on a hypertext link included within the final result set and associated with the web page to be accessed. In step 1210, responsive to the user's clicking on the hypertext link, a web page access event is generated. The web page access event identifies the web page being accessed together with a corresponding time stamp identifying the time of access. A listening routine (not shown) receives the event and saves the web page address and timestamp for use at a later time.

Continuing now with step 1215, the user initiating access to the web page from the final result set reviews this page, and/or other pages within the domain, for a period of time acquiring information of interest relevant to her search and/or further evaluating the potential usefulness of the information. Upon completion of this user review activity the user requests (typically through the browser "BACK" button), in step 1220, to return to the final result set. Responsive to this request, a web page exit event is generated in step 1222. The web page exit event comprises the web page address and a time stamp identifying the time of exit. Those of ordinary skill in the art will recognize that use of "events" is an exemplary approach to recording the times of access/exit to a web page and that numerous other techniques known in the art may also be deployed to accomplish this purpose.

In step 1225, a web page access counter associated with the just reviewed web page is retrieved. In various embodiments, a web page access counter is maintained in repository 155 of FIG. 1. If this is the very first time a web page is accessed, then the processing of step 1225 includes creating the counter and initializing the value to zero. Continuing with step 1230, the retrieved web page access counter is incremented by 1 in order to reflect the current access. Then, in step 1235, a web page review time is calculated by subtracting the timestamp calculated in step 1210 from the timestamp created in step 1222.

In step 1240, the calculated web page review time is compared to a predetermined threshold value. If the calculated review time is equal to or greater than this predetermined threshold value (i.e. the threshold is achieved), then control passes to step 1255 where the subsequent processing is further explained infra in conjunction with FIG. 13. Otherwise, control passes to step 1245 where the previously incremented web page access counter is saved for future calculations. In various embodiments locking protocols, known to those of ordinary skill in the art, are utilized to ensure the integrity of SFM counters in environments supporting concurrent access by multiple users to a given unit of information. Processing then continues with step 1250 where a test is made to determine if additional web pages remain in the final result set that have not yet been accessed by the user. If so, processing returns to step 1205, discussed supra. Otherwise, processing concludes at step 1260 by exiting the heuristic SFM collection process.

Figure 13:
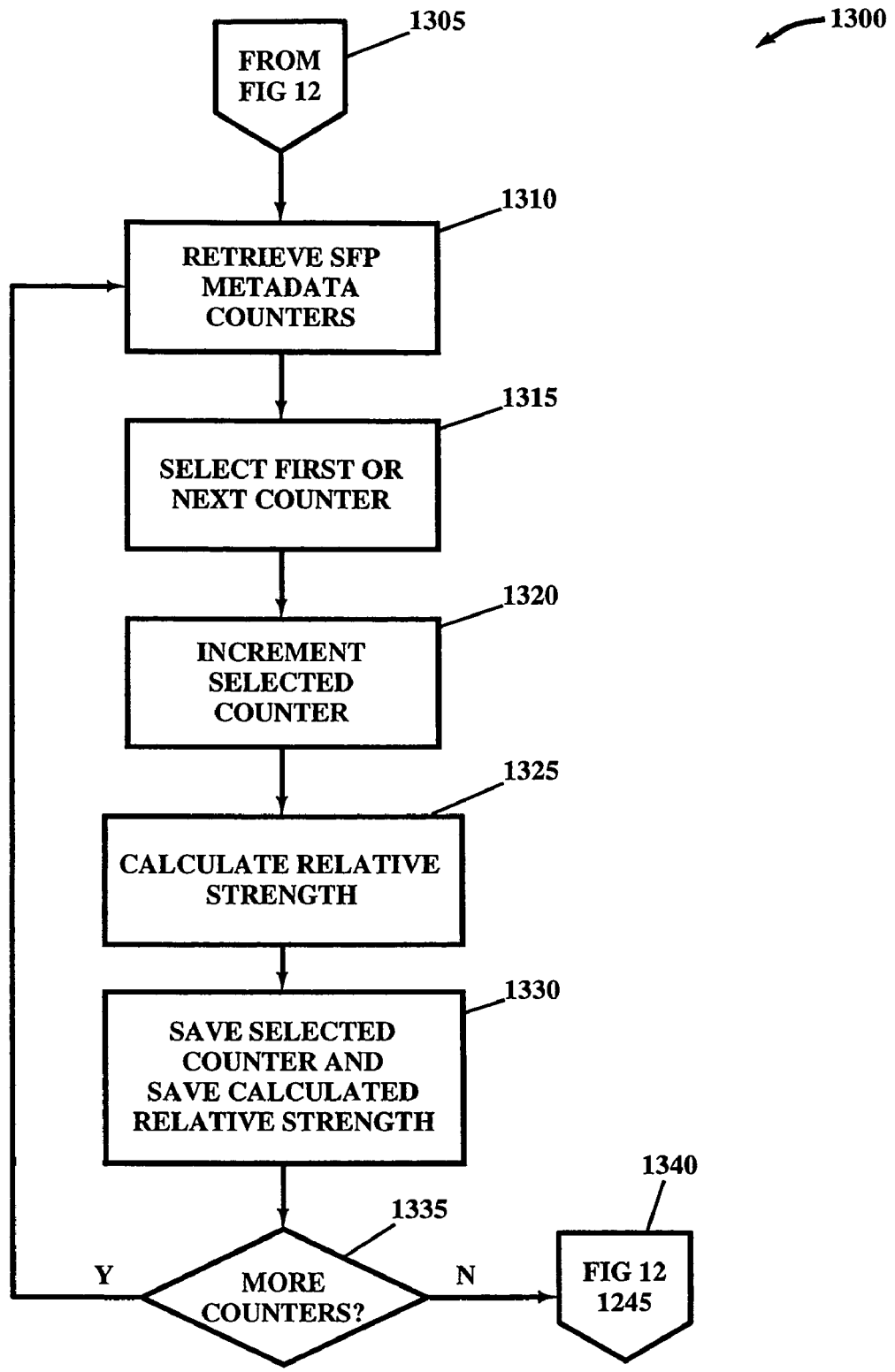
FIG. 13 is a flow diagram illustrating additional detail for the logic flow of FIG. 12.

Referring now to FIG. 13 flow diagram 1300 illustrates a continuation of the exemplary program flow for one aspect of heuristic SFM collection. The processing associated with FIG. 13 is responsive to detecting a user review time equal to or greater than a predetermined threshold value. This logic corresponds to the heuristic concept that if a user accesses a web page, and immediately returns to the final result set for another selection, then most likely this particular result was not closely aligned with the searcher's criteria, as reflected within the SFP utilized to produce the results. To the contrary, if the searcher spends an extended period of time, a reasonable conclusion follows that there is a close alignment between the user's SFP criteria and this particular result.

More specifically, in step 1305, control is received from step 1255 of FIG. 12. Then, in step 1310, the SFM counters associated with the reviewed web page are retrieved. In various embodiments, the SFM counters are maintained in repository 155 of FIG. 1. If this is the first request to retrieve SFM counters for the reviewed web page, then the counters are created for each SFP characteristic of the associated SFP and each counter is initialized to a value of zero.

In step 1315, an unprocessed SFM counter is selected, wherein the SFM counter is also associated with an SFP characteristic present within the SFP that was utilized to produce the final result set from which the reviewed web page was accessed. Continuing with step 1320, the selected counter is incremented by one. In step 1325 a relative strength calculation is performed. In various embodiments, the relative strength of an SFP characteristic present for a web page is calculated by dividing the associated SFP characteristic SFM counter by the web page access counter, (which was calculated in step 1230 of FIG. 12.)

In step 1330, the incremented selected counter and calculated relative strength value for the selected SFP characteristic is saved. In various embodiments, the relative strength value is associated with the reviewed web page and saved in repository 155 of FIG. 1. In various embodiments locking protocols, known to those of ordinary skill in the art, are utilized to ensure the integrity of SFM counters and relative strength values in environments supporting concurrent access by multiple users to a given unit of information. Those of ordinary skill in the art will further appreciate that the relative strength may also be calculated each time it is needed as an alternative to saving the value in repository 155. In other various environments, the relative strength value is defined as saved SFM. A test is then made in step 1335 to determine if more counters remain unprocessed wherein the one or more remaining counters are for SFM representing SFP characteristics for the SFP utilized to generate the final result set. If so, processing returns to step 1310, discussed supra. Otherwise, in step 1340, processing returns to step 1245 of FIG. 12.

A weighting may be assigned to each class of SFM (e.g. direct developer supplied SFM, evaluation accumulated SFM and heuristically accumulated SFM) wherein an overall composite relative strength may be calculated for each SFM characteristic associated with a unit of information. For example, in various embodiments, direct developer supplied SFM may receive a weighting of 50%, evaluation accumulated SFM receives a weighting of 30%, and heuristically accumulated SFM receives a weighting of 10%. An overall composite relative strength percentage is then easily calculated by multiplying the relative strength value for each class by its corresponding class weighting, and then summing the multiplication results. Those of ordinary skill in the art will recognize that various algorithms or processes may be utilized to calculate an overall relative strength from component relative strength values. It will be further appreciated that the exemplary weightings defined supra are arbitrary and that experience and/or changing conditions will result in alternative weightings being defined.

Referring now to FIG. 21, an exemplary relational database table 2100 is illustrated wherein accumulated SFM reflecting composite relative strength values, reflecting all SFM collection means, are retained for use by SF in forming final result sets. In various embodiments the name of the table is the name or address, or derivative thereof, of the unit of information to which the SFM corresponds. In various embodiments, table 2100 is created or updated from other stored SFM discussed supra prior to each use. In other various embodiments, table 2100 is periodically created or updated as triggered by time based or activity based algorithms.

Column 2120 comprises the categories of SFM collected, which generally corresponds to the categories of information that are eligible to be specified within an SFP. This correspondence is key in enabling a means for determining the degree of affinity between an SFP specification and the SFM associated with each unit of information. In the specific example of table 2100, column 2120 comprises categories "SEARCHER", "OBJECTIVE" and "DOMAIN". These correspond to the SFP categories designated by tabs 320, 322 and 324 of FIG. 3, as well as the categories designated in exemplary table 2000.

Column 2140 comprises various sub-categories for each primary category, which also correspond to the sub-categories of information that can be specified within an SFP. For example, table 2100, column 2140 subcategorizes SEARCHER into MODE, LEVEL, LANGUAGE and PROFESSION. These correspond to the SFP sub-categories designated in column 2040 of exemplary SFP table 2000.

Column 2160 refers to the information elements corresponding to the various categories and sub-categories of columns 2120 and column 2140. Note the correlation of information elements of column 2060, table 2000 representing an exemplary SFP to column 2160, table 2100 representing SFM for an exemplary unit of information. This correlation is key in enabling a means for determining the degree of affinity between an SFP specification and a unit of information, as further described infra.

Column 2180 illustrates an exemplary composite relative strength value for each corresponding information element from column 2160. A quick scan of column 2180 reveals that an SFP specifying that the searcher was a professional carpenter searching for particular keywords with an objective of performing a repair operation would have a very high degree of affinity to the exemplary unit of information corresponding to table 2100.

Those of ordinary skill in the art will appreciate that table 2000 and table 2100 are exemplary and numerous other data structures may be deployed in implementing the enhanced searching features described in the present application. Relational tables with more or less columns, or more or less rows may be utilized. Alternatively, hierarchical data structures, trees, lists, linked lists, hash tables, indexed data structures, and the like, or combinations thereof, may also be used.

In a preferred embodiment, an SFP contains an embedded, appended, or associated private area (hereinafter referred to as the SFP private area). Information of a statistical nature may be retained and/or accumulated in the SFP private area that facilitates communication between SF and various search engines eligible for deployment by SF, as well as communication directly between these SF deployable search engines. This area is referred to as a "private area" in that its contents are typically hidden from the user, in contrast to the other SFP characteristics established by, and visible to, the user. This information facilitates SF and search engine processing and is typically internal to this processing.

For example, relative strength statistics may be maintained for each search engine within the SFP private area. In various embodiments, a search engine relative strength percent may be calculated, for example, by computing the percentage of the top 20 entries in the final result set that was returned by a particular search engine. Since a plurality of search engines may return the same result, the total percentage of all search engines, with respect to a given SFP, may be higher than 100 percent.

Figure 22:
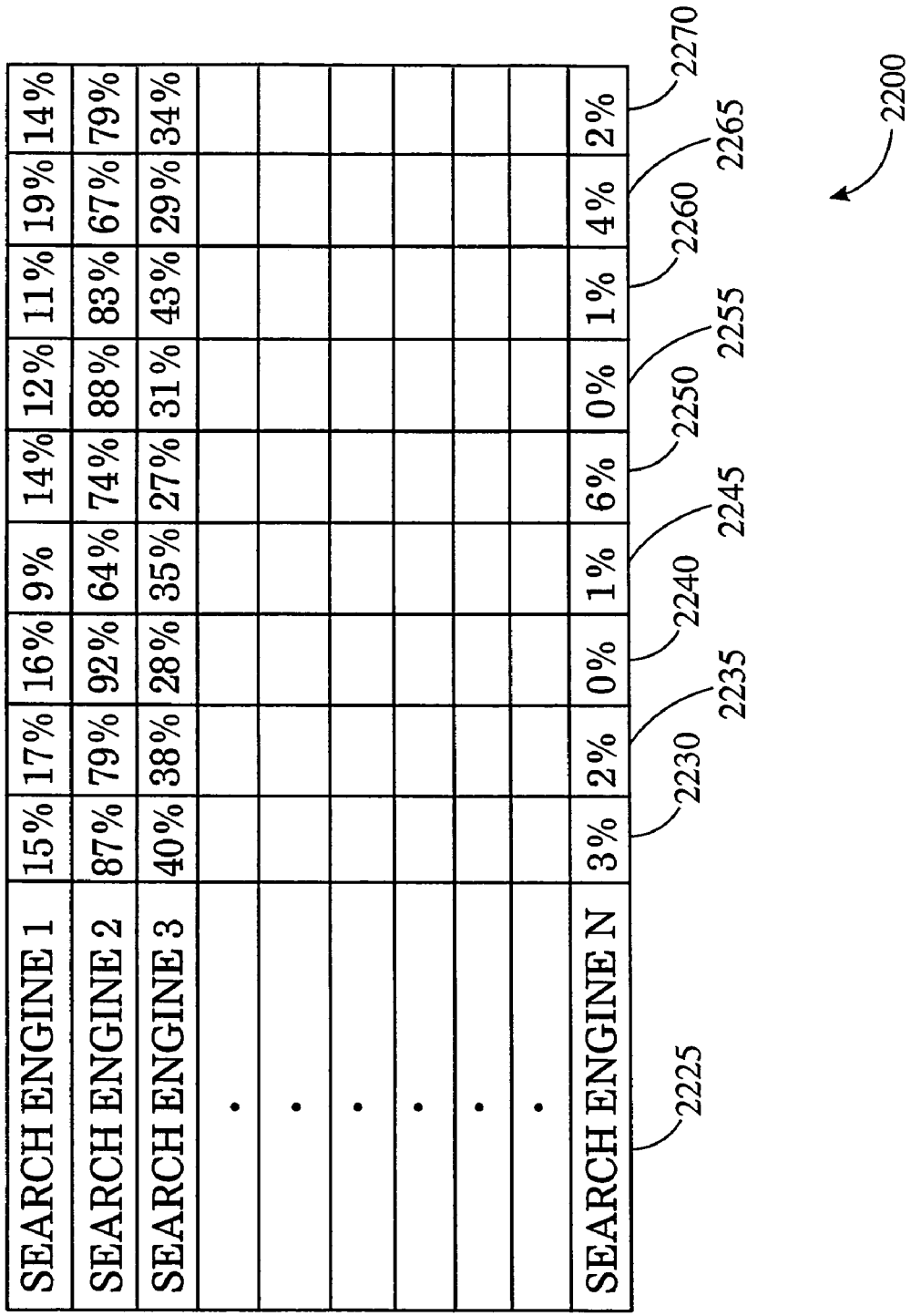
FIG. 22 shows an exemplary relational database table implementation of a search framework profile private area.

Referring now to FIG. 22, relational database table 2200 illustrates an exemplary SFP private area wherein search engine statistics are maintained. Column 2225 displays the list of Eligible search engines, namely Search Engine 1, Search Engine 2, Search Engine 3 and Search Engine N. Columns 2230 through 2265 represent the relative strength statistics associated with the most recent 8 searches performed in accordance with the associated SFP. Within exemplary table 2200, exemplary relative strength values are provided for Search Engine 1, Search Engine 2, Search Engine 3 and Search Engine N. Column 2270 displays the average relative strength statistic for each search engine, wherein the values in columns 2230 through 2265 are summed and then divided by 8 to calculate the average relative strength value for the previous 8 most recent searches.

Casual observation of exemplary table 2200 shows that with respect to the associated SFP, Search Engine 2 is the star performer with very strong results of 79%. Additionally, Search Engine 3 has seen moderate results of 34%, and Search Engine 1 having a relatively smaller amount of success with 14%. Search Engine N, in the present example, on average is contributing only 2% to the final result set for the associated SFP. In various embodiments, SF may choose to eliminate Search Engine N from future searches for the associated SFP based upon its marginal additional value in comparison to the computing resources required to continue its inclusion in the eligible set of search engines.

Those of ordinary skill in the art will recognize that an almost unlimited number of variations may be used in determining a relative strength percent. For example, the top 20 may alternatively be all results in the final result set; or any number between 1 and the number of entries in the final result set. Furthermore, the relative strength may be calculated as a "rolling" average where, as in the example associated with FIG. 22, only the current search and the most recent previous 7 searches are used. In various other embodiments, a combination of the above approaches is used wherein consideration is given to both the contribution to the total final result set and the contribution to the top portion of the result set. Whatever the specific technique used, the calculation is based upon the contributions of a particular search engine in making up the final result set and a higher percentage is indicative of a more successful search engine for a given SFP than a search engine with a lower percentage value.

Figure 14:
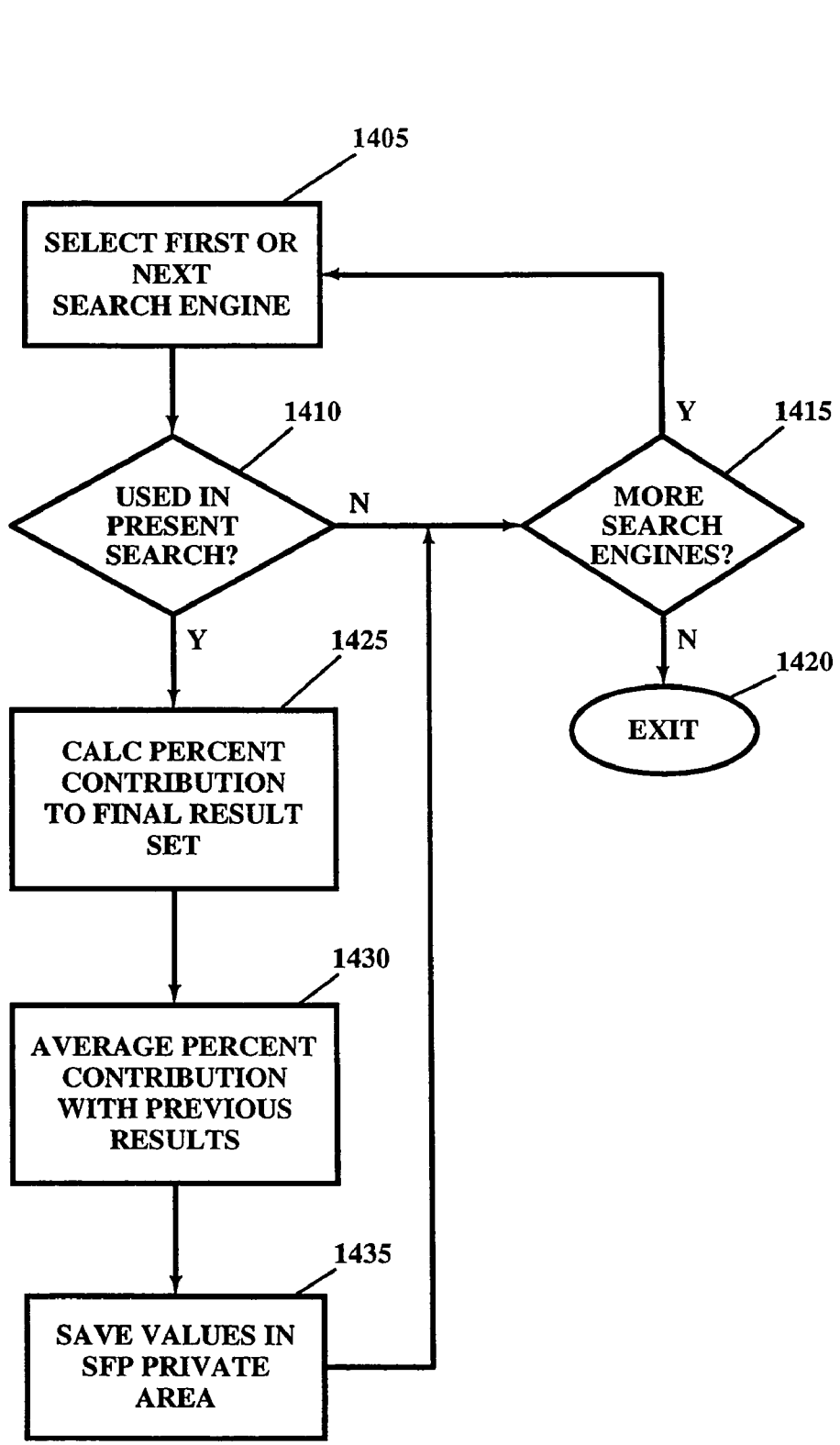
FIG. 14 is a flow diagram illustrating an exemplary logic flow for calculating and saving search engine statistical information.

Referring now to FIG. 14 flow diagram 1400 illustrates an exemplary program flow for calculating a relative strength percent for one or more search engines associated with a search request. In step 1405, a first or next search engine is selected from those search engines recorded within the SFP private area. If the selected search engine was used in a just completed search request performed by SF, then control passes to step 1425. Otherwise, control passes to step 1415 where a test is made to determine if more search engines are available for selection from within the SFP private area. If so, control returns to step 1405, otherwise, the process exits at step 1420.

Returning now to step 1425, which received control as a result of the test at step 1410, a percentage contribution value is calculated representing the number of search results found by this search engine with respect to all search results included within the final result set. Those of ordinary skill in the art will appreciate that numerous variations may occur in making this calculation. For example, the calculation may be limited to the top 20 search results rather than basing the calculation on all search results included within the final result set. However, since the calculated value is used in a comparative way with respect to other search engines, numerous variations in the calculation are acceptable as long as all calculations are performed in a consistent way for each search engine.

In step 1430, this contribution percentage is averaged with previous results recorded for this search engine. Those of ordinary skill in the art will appreciate that numerous implementations may be developed to calculate an average percentage. For example, the SFP private area may include an array of 8 contribution percentages for each search engine wherein the oldest calculated value is displaced with the most recently calculated contribution percentage. The 8 values may then be averaged and further saved in the SFP private area; or, alternatively, the average may be calculated whenever it is needed.

Continuing with step 1435, in accordance with the averaging method selected, the calculated values are recorded within the SFP private area for the currently processed search engine. Control then passes to step 1415, discussed supra.

In various embodiments, SF may query the search engine performance statistics by viewing data stored within the SFP private area. In accordance with these statistics, SF may determine that one or more search engines are to be excluded from use with respect to a search request utilizing a particular SFP. Statistical information within the SFP private area may also be useful to a search engine. In various embodiments, the information within the SFP private area may be obtained by invoking an SFP API (application programming interface). Alternatively, the SFP private area may be accessed directly by the search engine.

Figure 15:
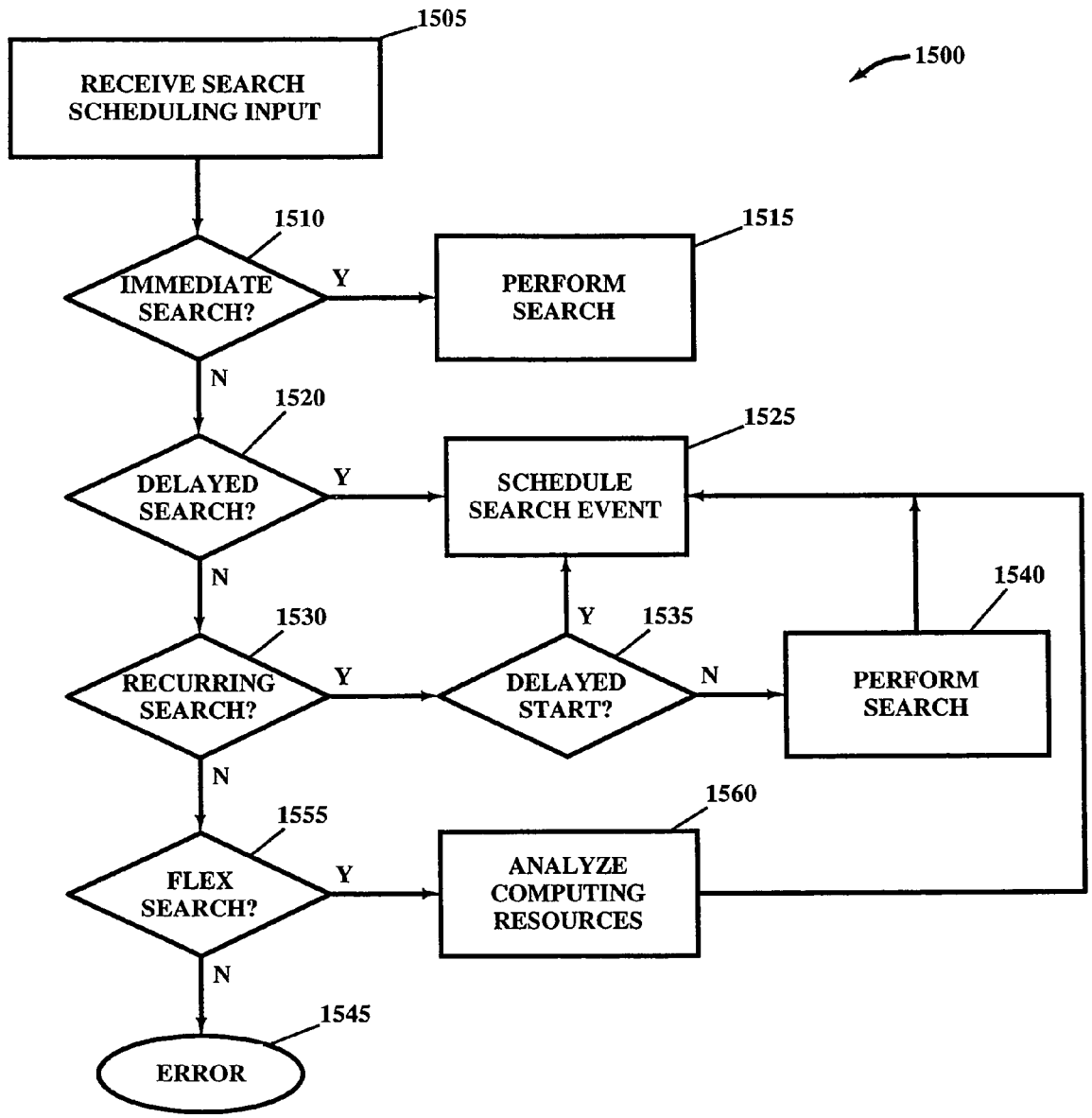
FIG. 15 is a flow diagram illustrating an exemplary logic flow for scheduling a search event.

Referring now to FIG. 15, flow diagram 1500 illustrates an exemplary program flow for scheduling a search request. In step 1505, a meta search facility or search engine receives search scheduling information pertaining to the scheduling of a search request. In various embodiments, search scheduling information is accessed from an SFP associated with a search request. As explained supra, in conjunction with FIG. 7, a user may use an SFP Wizard to enter search scheduling information for an SFP wherein the scheduling information is utilized each time the SFP is referenced in a search request. Those of ordinary skill in the art will appreciate that numerous other facilities may be defined for capturing and maintaining scheduling information for subsequent use with a search request.

Utilizing the retrieved search scheduling information, in step 1510, a test is made to determine if a requested search is to be immediately performed. If so, in step 1515, the search is performed. Otherwise, control passes to step 1520 where an additional test is made to determine the requested search is to be delayed. If the requested search is to be delayed, in step 1525 a search event for the corresponding search request is scheduled for a later time in accordance with the user supplied scheduling information. In a preferred embodiment, this scheduling is accomplished by adding the search event as an entry to a scheduling event table to be utilized by a search event task scheduler. An indication that a search has been successfully scheduled is returned to the user.

This entry comprises a complete description of the search to be performed together with a clock value representing the exact date and time that the search should be performed. In various embodiments, in lieu of actual scheduling information, the entry may comprise pointers or other reference data allowing access to some or all of the needed scheduling information external to the scheduling event table. In other various embodiments, the table may be sorted or otherwise maintained in "clock order" wherein a search event task scheduler need not continue checking entries in the table once a sequentially accessed entry is encountered with a clock value that exceeds the current clock value. Additional detail on search event scheduling is described infra in conjunction with flow diagram 1600 of FIG. 16.

Returning now to step 1520, if the requested search is not delayed, then control passes to step 1530 to test for a recurring search. If it is a recurring search, then, in step 1535, an additional test is made to determine if the recurring search has a delayed start. If the initial search is not delayed, then the initial search is performed in step 1540 followed by the scheduling of a future search event for the next search instance in step 1525 in accordance with the user supplied scheduling interval information. If the initial search is to be delayed, then control passes directly to step 1525 to schedule a search event for the initial search. In a preferred embodiment, an indication that a search has been successfully scheduled is returned to the user.

Returning now to step 1530, if it is not a recurring search, then control passes to step 1555 where a test is made to determine if this is a flex search. As discussed supra, a flex search requests that the search be performed in accordance with a timing that will utilize computing resources in the most efficient manner. If the search is a flex search, then, in step 1560, computing resources are analyzed to make a determination for an optimal time to perform the search request.

In various embodiments, additional specification may also be included by a user to request that computing resources be optimized within the constraints of a search completion deadline. Upon completing the analysis of step 1560, control passes to step 1525 together with scheduling information derived from user input and an analysis of computing resources wherein a search event is scheduled in accordance with this passed information. In a preferred embodiment, an indication that a search has been successfully scheduled is returned to the user. Returning now to step 1555, if it is not a flex search request, then an error is generated at step 1545.

Figure 16:
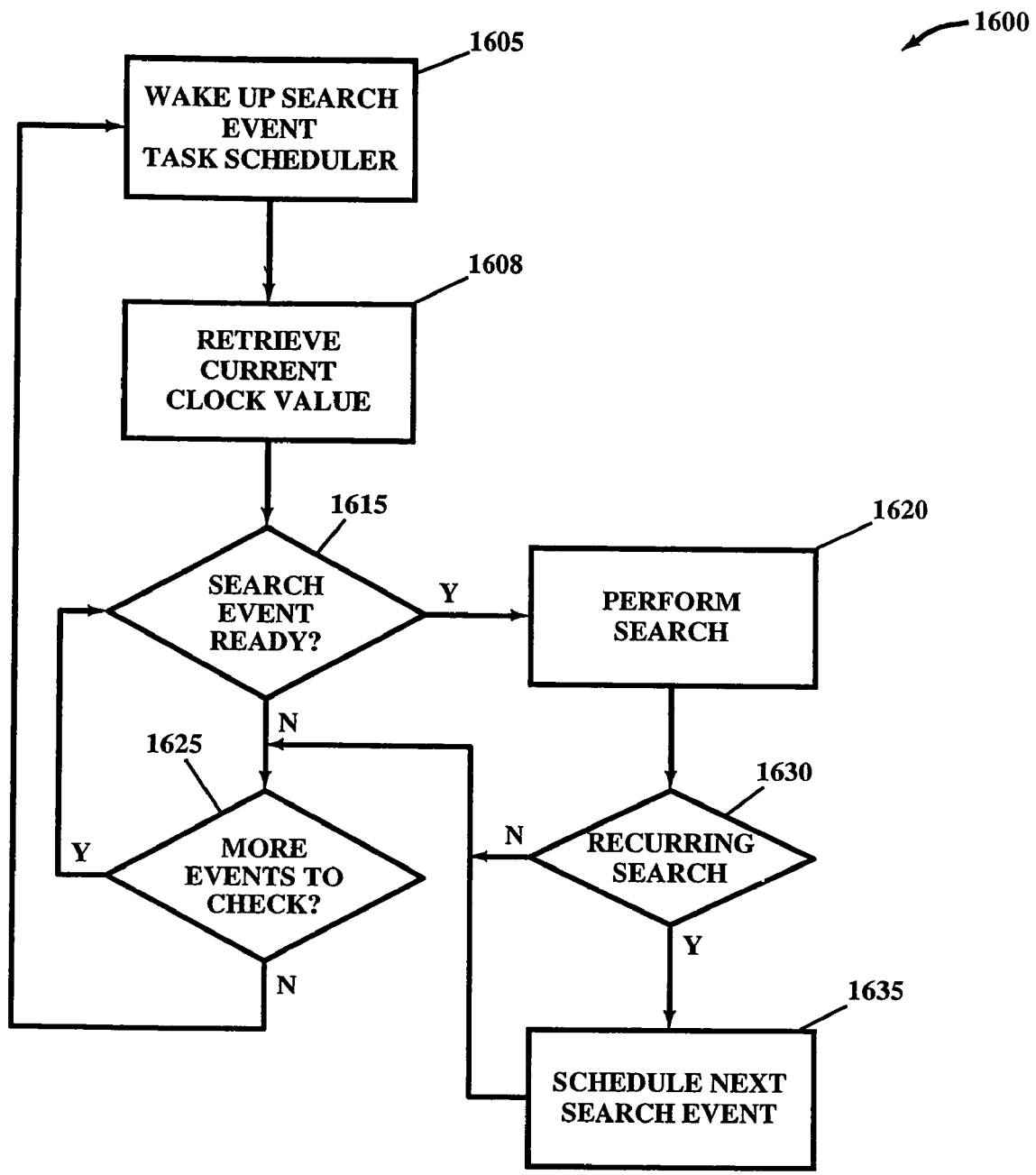
FIG. 16 is a flow diagram illustrating an exemplary logic flow for processing scheduled search events.

Referring now to FIG. 16 flow diagram 1600 illustrates an exemplary program flow for processing search events created at step 1525 of FIG. 15. In step 1605, a search event task scheduler is periodically awakened. The search event task scheduler, in step 1608, retrieves the current system clock value. Then, in step 1615, the first or next event from a scheduling event table is checked to determine if this search event is now ready to be activated (this is the case if the current system clock value retrieved in step 1608 is equal to or greater than the scheduled clock time stored in the scheduling event table for this event.) If so, in step 1620, the search associated with the search event entry is performed. Next, in step 1630, a test is made to determine if the search just performed is a recurring type search. If so, a new search event is scheduled, as described infra in conjunction with flow diagram 1500, in step 1635, before continuing with step 1625. Otherwise processing continues directly with step 1625, wherein scheduling step 1635 is bypassed.

Returning now to step 1615, if the search event is not ready to be activated, processing continues with step 1625 where a test is made to determine if there are more search event entries in the scheduling event table that need to be checked. If so, processing returns to step 1615, described supra. Otherwise, processing returns to step 1605 to await the next search event ask scheduler activation cycle.

In a preferred embodiment, the current clock value is retrieved once for a given wake up of the search event task scheduler and everything that is ready to be scheduled in accordance with that clock value is scheduled. Those of ordinary skill in the art will appreciate that a new current clock value may be retrieved for each check made in step 1615. In various embodiments, this may be implemented by passing control from step 1625 to step 1608 if there are more events to check.

Figure 17:
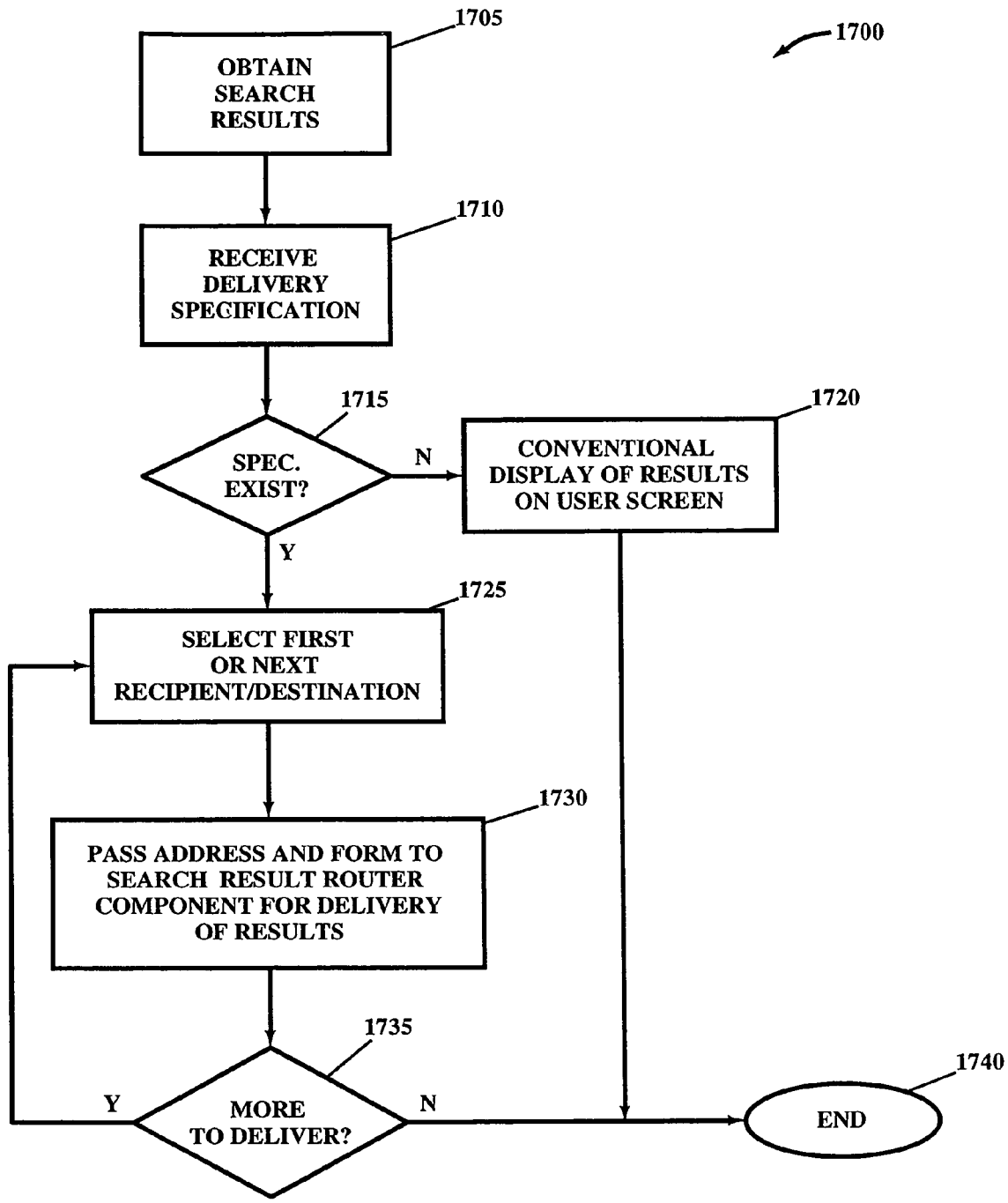
FIG. 17 is a flow diagram illustrating an exemplary logic flow for delivering search results in a accordance with a delivery specification.

Referring now to FIG. 17 flow diagram 1700 illustrates an exemplary program flow for delivering search results in accordance with delivery options specified by the user. In step 1705 the final result set is obtained in accordance with a user's search request. In step 1710, the meta search facility or search engine receives search delivery input. In various embodiments, this search delivery input specification is accessed from an SFP associated with the search request. As explained supra, in conjunction with FIG. 8, a user may use an SFP Wizard to enter delivery specifications in an SFP. The delivery specifications in an SFP are utilized to deliver the search results from a search request referencing the SFP. Those of ordinary skill in the art will appreciate that numerous other facilities may be defined for capturing and maintaining delivery specifications from a user for subsequent use with a search request.

In step 1715, a test is made to determine if delivery input exists. If not, the search results are displayed in conventional way, which for most search engines and meta search facilities typically means displaying the search results on the user's display from which the search request was made. Processing then concludes at step 1740. Otherwise processing proceeds to step 1725 wherein the first or next recipient/destination, designated in the delivery specification, is selected. Next, in step 1730, the address of the recipient/destination and delivery form is passed to a search result router component to effect delivery. As previously discussed in conjunction with FIG. 8, the type of delivery may take on numerous different forms, such as a fax machine, another computer program, an email, a URL, a display or a folder. Those of ordinary skill in the art appreciate that these forms are well known generally in the art and, accordingly, the various communication protocols used in conjunction with these forms are not included within the present disclosure.

In step 1735, a test is made to determine if more recipients have been included in the delivery specification that have not yet been forwarded to the search result router component. If so, processing returns to step 1725, discussed supra. Otherwise, processing concludes at step 1740.

Figure 18:
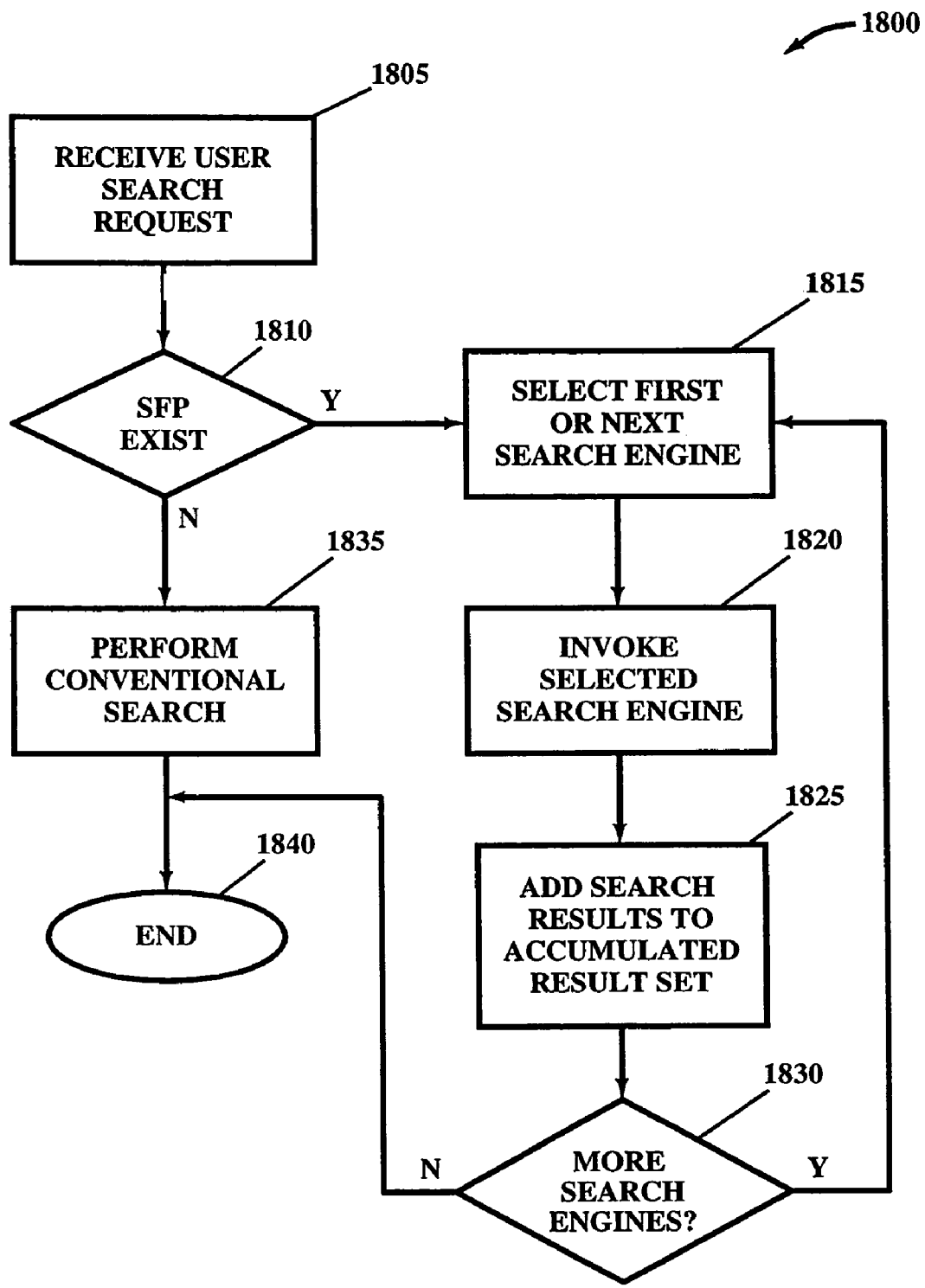
FIG. 18 is a flow diagram illustrating an exemplary logic flow for the generation of an accumulated result set.

Referring now to FIG. 18, flow diagram 1800 illustrates an exemplary program flow for generating an accumulated result set. Each entity contained within an accumulated result set comprises an identifier corresponding to a unit of information to be included in a search result. The identifier, such as a URL address, identifies and facilitates access to the corresponding unit of information. In addition to the identifier, other information may be included, such as a brief description of the unit of information.

In step 1805, SF receives a search request from a user. Control then passes to step 1810 where a test is made to determine if an SFP is associated with the user's search request. If not, control passes to step 1835 where a conventional search is performed in accordance with the search keyword specification supplied by the user prior to terminating at step 1840. A conventional search is used herein to mean a search performed without the benefit of non-topical search specifications.

Returning now to step 1810, if an SFP was specified by the user as part of the search request, then processing continues with step 1815. In step 1815, the first or next search engine is selected for deployment by SF. In various embodiments, the SFP is utilized to select a subset of eligible search engines available to SF, based upon relative strength statistics recorded therein. In other various embodiments a set of eligible search engines is predetermined or selected by other means known to those of ordinary skill in the art.

Continuing with step 1820 the selected search engine is invoked by SF on behalf of the user to obtain search results in accordance with the user's keyword specification. In various embodiments, SF retains knowledge of the features and capabilities of the selected search engines. For example, a selected search engine may support various non-topical specifications such as domain specifications. SF may enhance the overall efficiency of the search operations by "passing through" various SFP specifications to the selected search engine upon invocation.

Then, in step 1825, the search results returned from the search engine invocation are added to the accumulated result set. In various other embodiments, all of the eligible search engines are deployed utilizing separate computing tasks such that multiple search engines may operate concurrently for enhanced performance in comparison to a serial deployment. In still other various embodiments, the ranking performed by the individual search engines is retained within the accumulated result set. In this way, SF may, at least partially, rely upon the rankings of the search engines in the event of little or no SFM.

In step 1830, a test is made to determine if additional search engines need to be deployed. If so, control passes to step 1815, discussed supra. Otherwise, processing terminates at step 1840.

Figure 19:
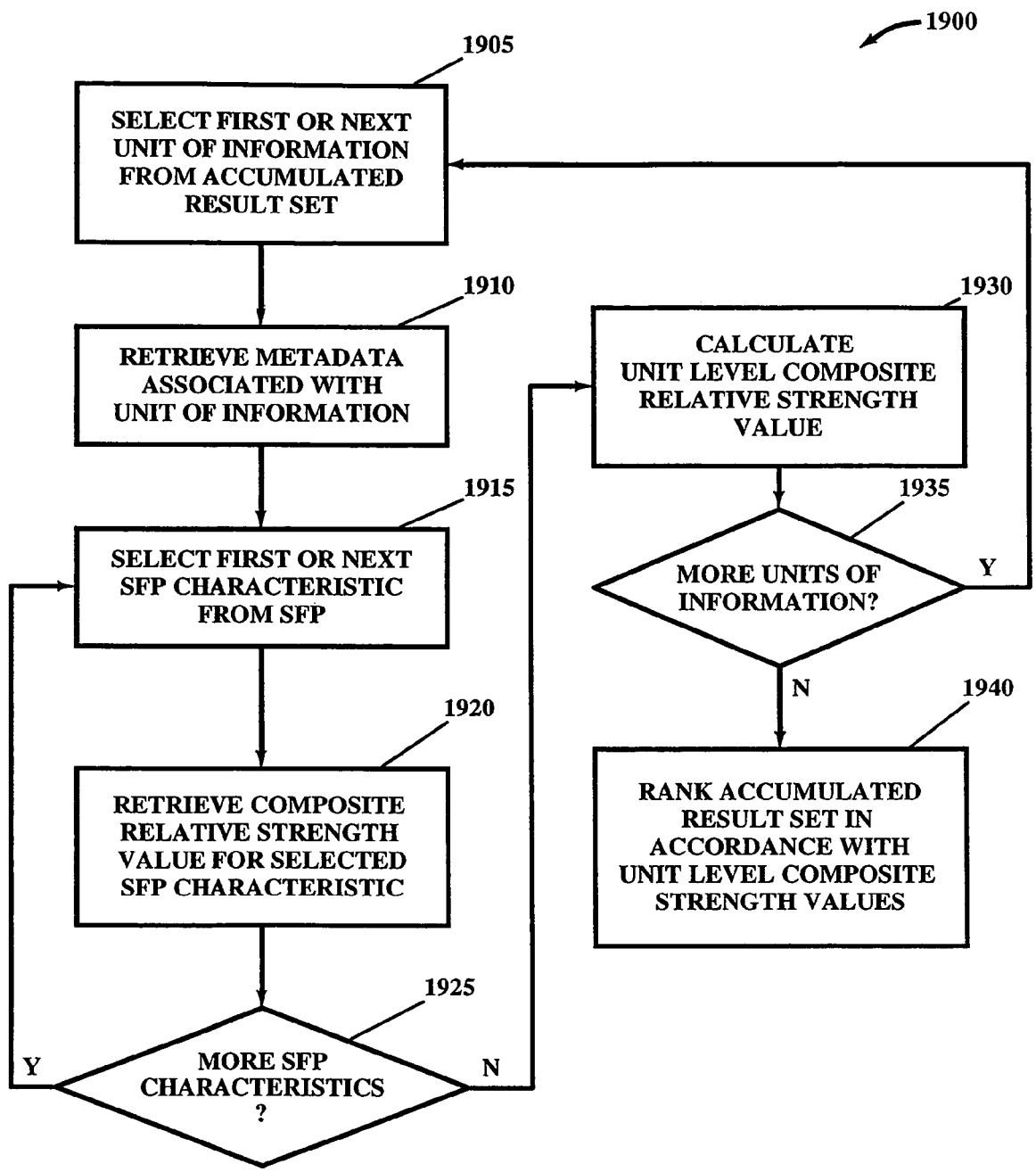
FIG. 19 is a flow diagram illustrating an exemplary logic flow for the transformation of an accumulated result set into a final result set.

Referring now to FIG. 19, flow diagram 1900 illustrates an exemplary program flow for transforming an accumulated result set into a final result set. In step 1905, a first or next unit of information is selected from the accumulated result set. Then, in step 1910, SFM associated with this unit of information, if any, is retrieved from the SFM repository.

Continuing with step 1915, a first or next SFP characteristic is selected from the SFP. Then, in step 1920, the composite relative strength value for the selected SFP characteristic is retrieved from the SFM, if any, for the selected unit of information. Those of ordinary skill in the art will recognize that the relative strength value may have been pre-computed and stored with the SFM. In other various embodiments, a relative strength value is calculated from other stored SFM, if any, each time it is needed. In still other various environments, a relative strength value is the saved SFM. Those of ordinary skill in the art will further appreciate that the composite relative strength value is computed as one means of determining the degree of affinity between a unit of information and a specified SFP.

In step 1925, a test is made to determine if more SFP characteristics remain unprocessed within the SFP. If so, processing returns to step 1915, discussed supra. Otherwise, processing continues with step 1930. In step 1930, a unit level composite relative strength value is calculated for the unit of information based upon a consideration of all of the individual composite relative strength values accumulated for each SFP characteristic. Those of ordinary skill in the art will recognize that an almost unlimited number of techniques and methods may be deployed in determining a unit level composite relative strength value for a unit of information.

For example, in various embodiments, a simple average may be computed based upon the individual relative strength values for each SFP characteristic. In other various embodiments, a minimum threshold value must be attained for all SFP characteristics within the SFP in order to compute a simple average. If a minimum threshold is not achieved for each SFP characteristic, then other computations are deployed to arrive at a reduced relative strength value relative to a simple average. On a conceptual basis, such an alternative computation acknowledges that a search result with a high relative strength value may have little usefulness to a user if even one SFP characteristic is below a threshold relative strength value. Exemplary calculations include capping the average relative strength value if one or more thresholds fail to hold.

While the specific computations for calculating a unit level composite relative strength value are subjective and may vary in accordance with the views and skills of a particular computer programmer, the objective of the calculation is well defined. That objective is to generate a relative strength value for the unit of information that, in consideration of all non-topical specifications within the SFP, approximates the overall correlation of the unit of information to the SFP.

Continuing now with step 1935, a test is made to determine if there are additional units of information within the accumulated result to be processed. If so, processing returns to step 1905, discussed supra. Otherwise, processing continues with step 1940. In step 1940, the accumulated result set is ranked in accordance with the unit level composite relative strength value previously calculated for each unit of information (in step 1930, supra.) This ranking operation transforms the accumulated result set into a final result set to be delivered responsive to the user's search request. In various alternative embodiments, low ranking results may be further pruned from the final result set prior to delivery.

Those of ordinary skill in the art will appreciate that various units of information may be associated with an SFM of questionable credibility. This may occur, for example, if very few evaluations have been performed in conjunction with an absence of direct developer input. As more and more evaluations or heuristic derivations occur, the consensus SFM increases in credibility and may be relied upon for ranking purposes. In those cases where there is insufficient SFM credibility, or no SFM at all, for a unit of information, the ranking process may be, at least partially, based upon the ranking of the various search engines utilized to perform the search operation.

Taken in combination flow diagrams 1000 through 1900 of FIGS. 10 through 19, respectively, in conjunction with supporting diagrams and detailed descriptions provide for an improved searching technology wherein a user may receive search results with a higher degrees of relevancy, obtained with significantly less effort, and with added flexibility regarding schedule, form and delivery options.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. §112, sixth paragraph, unless the element is expressly recited using the phrase "means for" or "step for."

While the various embodiments of the present invention has been described in detail, it will be understood that modification and adaptations to the embodiment(s) shown may occur to one of ordinary skill in the art without departing from the spirit and scope of the present invention as set forth in the following claims. Thus, the scope of this invention is to be construed according to the appended claims and not just to the specific details disclosed in the exemplary embodiments.

What is claimed:

1. A method for delivering search results responsive to a user search request, comprising:

receiving a search request from a user by way of a processor wherein said search request comprises a search framework profile and at least one search term wherein the search framework profile directs a search facility using one or more user-selected non-topical search characteristics, the non-topical search characteristics selected from a set of predefined non-topical search characteristics to generate the search framework profile;

generating an accumulated result set of identifiers wherein each identifier within said set of identifiers facilitates access to a corresponding unit of information in a data store, and wherein said corresponding unit of information comprises said at least one search term;

utilizing search framework metadata associated with said accumulated result set to rank the identifiers of said accumulated result set in accordance with a degree of affinity of each of said corresponding units of information to said search framework profile to form a final result set, wherein said degree of affinity is based at least partially on a unit level composite relative strength value associated with said corresponding unit of information, the search framework metadata for each corresponding unit of information comprising one or more stored predefined relative strength values, each relative strength value corresponding directly and respectively to each of the one or more user-selected non-topical search characteristics in the search framework profile; and delivering said final result set to said user.

2. The method of claim 1 wherein said corresponding unit of information comprises a web page.

3. The method of claim 1 wherein said data store comprises a computing network.

4. The method of claim 3 wherein said computing network comprises a World Wide Web.

5. The method of claim 1 wherein said data store comprises a computer.

6. The method of claim 1 wherein said ranking further comprises deleting at least one identifier from said set of identifiers when said degree of affinity is below a threshold value.

7. The method of claim 1 wherein said search framework profile comprises a plurality of search framework profiles.

8. The method of claim 1 wherein said receiving comprises:

receiving a search framework identifier; and retrieving said search framework profile from a repository utilizing said search framework identifier.

9. The method of claim 8 wherein said repository is a computer file.

10. The method of claim 8 wherein said repository is a relational database and said search framework profile is in the form of a database table.

11. The method of claim 1 further comprising:

selecting a search engine to at least partially generate said accumulated result set wherein said search engine selection is based at least partially on said search framework profile.

12. The method of claim 11 wherein said search engine is a plurality of search engines.

13. The method of claim 1 wherein said unit level composite relative strength value is less than an average relative strength value if at least one threshold for a relative strength value associated with a search framework profile characteristic for said corresponding unit of information is not achieved.

14. A method for creating a search framework profile for use with a framework reactive search facility, comprising:
   activating by way of a processor a Search Framework Profile ("SFP") Wizard responsive to a user request;
   receiving user input responsive to data displayed by said SFP Wizard to define a search framework profile, the search framework profile comprising one or more user-selected non-topical search characteristics, the non-topical search characteristics selected from a set of predefined non-topical search characteristics;
   saving said user input in a repository wherein said search framework profile comprises said user input wherein the SFP directs a search facility using the one or more user-selected non-topical search characteristics; and
   wherein the SFP is usable by a search facility to retrieve search results comprising units of information, each unit of information having corresponding search framework metadata, which is used to rank the search results in accordance with a degree of affinity, wherein said degree of affinity is based at least partially on a unit level composite relative strength value associated with said corresponding unit of information, comprising one or more stored predefined relative strength values, each relative strength value corresponding directly and respectively to one or more of the user-selected non-topical search characteristics in the search framework profile.

15. The method of claim 14 wherein said search framework profile is a plurality of search framework profiles.

16. The method of claim 14 wherein said search framework profile has a framework identifier wherein said framework identifier is formed from said user input.

17. The method of claim 16 wherein said framework identifier is a search framework profile name.

18. The method of claim 14 wherein said search framework profile comprises at least one characteristic of a searcher.

19. The method of claim 18 wherein said search framework profile further comprises at least one specification of a search objective.

20. The method of claim 19 wherein said search framework profile further comprises at least one specification of a search domain.

21. A method for information interchange between a plurality of search engines, comprising:
   storing by way of a processor information, related to processing by a first search engine, in a first area associated with a search framework profile wherein the search framework profile directs a search facility using one or more user selected non-topical search characteristics, the non-topical search characteristics selected from a set of predefined non-topical search characteristics to generate the search framework profile;
   retrieving at least a subset of said information from said first area by a second search engine, the subset of said information comprising search framework metadata used by the second search engine for ranking identifiers of an accumulated results set returned by the second search engine, the identifiers of the accumulated results set ranked in accordance with a degree of affinity of each of a unit of information corresponding to said identifiers; and
   wherein the search framework profile is usable by a search facility to retrieve search results comprising units of information, each unit of information having corresponding search framework metadata, which is used to rank the search results in accordance with a degree of affinity, wherein said degree of affinity is based at least partially on a unit level composite relative strength value associated with said corresponding unit of information, comprising one or more stored predefined relative strength values, each relative strength value corresponding directly and respectively to one or more of the user-selected non-topical search characteristics in the search framework profile.

22. The method of claim 21 further comprising utilizing said first area at least in part to exclude said first search engine from a plurality of search engines eligible for use by a framework reactive search facility to perform a user requested search operation.

23. A method for performing a computerized search, comprising:
   requesting a search operation by way of a processor wherein said search operation request comprises a search framework profile and at least one search term, and wherein said search framework profile comprises one or more non-topical search characteristics, the non-topical search characteristics selected from a set of predefined non-topical search characteristics to generate the search framework profile;
   receiving from a framework reactive search facility, responsive to said requested search operation, a final result set comprising identifiers wherein each identifier within said final result set of identifiers facilitates access to a corresponding unit of information and wherein said corresponding unit of information comprises said search term and each unit of information having corresponding search framework metadata, which is used to rank the search results in accordance with a degree of affinity, wherein said degree of affinity is based at least partially on a unit level composite relative strength value associated with said corresponding unit of information, comprising one or more stored predefined relative strength values, each relative strength value corresponding directly and respectively to one or more of the user-selected non-topical search characteristics in the search framework profile, and wherein said final result set of identifiers are ranked in accordance with the degree of affinity of each of said corresponding units of information to said non-topical search characteristic; and
   making available said final result set to a user initiating the search operation.

24. The method of claim 23 wherein said search framework profile comprises user input captured by a search framework profile wizard.

25. A method for delivering search results responsive to a user search request, comprising:
   receiving a search request by way of a processor from a user wherein said search request comprises a search objective and at least one search term, the search objective selected from a set of predefined search objectives to generate a search framework profile;
   generating a set of identifiers wherein each identifier within said set of identifiers facilitates access to a corresponding unit of information in a data store, and wherein said corresponding unit of information comprises said at least one search term;
   utilizing search framework metadata associated with said accumulated result set to rank the identifiers of said accumulated result set in accordance with a degree of affinity of each of said corresponding units of information to said search objective to form a final result set, wherein said degree of affinity is based at least partially on a unit level composite relative strength value associated with said corresponding unit of information, the search framework metadata for each corresponding unit of information comprising one or more stored predefined relative strength values, each relative strength value corresponding directly and respectively to each of the search objectives in the set of predefined search objectives; and delivering said ranked set of identifiers to said user.

26. A method for making a computer implemented process to enable delivering search results responsive to a user search request, said method comprising:

encoding a first set of computer instructions onto a computer readable medium, said first instructions configured to receive a search request from a user wherein said search request comprises a search framework profile and at least one search term wherein the search framework profile directs a search facility using one or more user-selected non-topical search characteristics, the non-topical search characteristics selected from a set of predefined non-topical search characteristics to generate the search framework profile;

encoding a second set of computer instructions onto a computer readable medium, said second instructions configured to generate an accumulated result set of identifiers wherein each identifier within said set of identifiers facilitates access to a corresponding unit of information in a data store, and wherein said corresponding unit of information comprises said at least one search term;

encoding a third set of computer instructions onto a computer readable medium said, third instructions configured to utilize search framework metadata associated with said accumulated result set to rank the identifiers of said accumulated result set in accordance with a degree of affinity of each of said corresponding units of information to said search framework profile to form a final result set, wherein said degree of affinity is based at least partially on a unit level composite relative strength value associated with said corresponding unit of information, the search framework metadata for each corresponding unit of information comprising one or more stored predefined relative strength values, each relative strength value corresponding directly and respectively to each of the one or more user-selected non-topical search characteristics in the search framework profile; and encoding a fourth set of computer instructions onto a computer readable medium, said fourth first instructions configured to deliver said final result set to said user.

27. The method of claim 26 wherein said corresponding unit of information comprises a web page.

28. The method of claim 26 wherein said data store comprises a computing network.

29. The method of claim 28 wherein said computing network comprises a World Wide Web.

30. The method of claim 26 wherein said data store comprises a computer.

31. The method of claim 26 wherein said ranking further comprises encoding a fifth set of computer instructions onto a computer readable medium, said fifth instructions configured to delete at least one identifier from said set of identifiers when said degree of affinity is below a threshold value.

32. The method of claim 26 wherein said search framework profile comprises a plurality of search framework profiles.

33. The method of claim 26 wherein said first set of computer instructions comprises:

manipulating the computer readable medium to direct a computer to receive a search framework identifier; and manipulating the computer readable medium to direct a computer to retrieve said search framework profile from a repository utilizing said search framework identifier.

34. The method of claim 33 wherein said repository is a computer file.

35. The method of claim 33 wherein said repository is a relational database and said search framework profile is in the form of a database table.

36. The method of claim 26 further comprising:

encoding a sixth set of computer instructions onto a computer readable medium, said sixth instructions configured to select a search engine to at least partially generate said accumulated result set wherein said search engine selection is based at least partially on said search framework profile.

37. The method of claim 36 wherein said search engine is a plurality of search engines.

38. The method of claim 26 wherein said unit level composite relative strength value is less than an average relative strength value if at least one threshold for a relative strength value associated with a search framework profile characteristic for said corresponding unit of information is not achieved.

39. A system for delivering search results responsive to a user search request, comprising:

a processor; and a memory storing instructions that:

receive a search request from a user wherein said search request comprises a search framework profile and at least one search term wherein the search framework profile directs a search facility using one or more user-selected non-topical search characteristics, the non-topical search characteristics selected from a set of predefined non-topical search characteristics to generate the search framework profile;

generate an accumulated result set of identifiers wherein each identifier within said set of identifiers facilitates access to a corresponding unit of information in a data store, and wherein said corresponding unit of information comprises said at least one search term;

rank the identifiers of said accumulated result set in accordance with a degree of affinity of each of said corresponding units of information to said search framework profile to form a final result set, wherein said degree of affinity is based at least partially on a unit level composite relative strength value associated with said corresponding unit of information, the search framework metadata for each corresponding unit of information comprising one or more stored predefined relative strength values, each relative strength value corresponding directly and respectively to one or more of the user-selected non-topical search characteristics in the search framework profile; and deliver said final result set to said user.

40. The system of claim 39 wherein said corresponding unit of information comprises a web page.

41. The system of claim 39 wherein said data store comprises a computing network.

42. The system of claim 41 wherein said computing network comprises a World Wide Web.

43. The system of claim 39 wherein said data store comprises a computer.

44. The system of claim 39 wherein said ranking further comprises deleting at least one identifier from said set of identifiers when said degree of affinity is below a threshold value.

45. The system of claim 39 wherein said search framework profile comprises a plurality of search framework profiles.

46. The system of claim 39 wherein said receiving comprises:
   receiving a search framework identifier; and
   retrieving said search framework profile from a repository utilizing said search framework identifier.

47. The system of claim 46 wherein said repository is a computer file.

48. The system of claim 46 wherein said repository is a relational database and said search framework profile is in the form of a database table.

49. The system of claim 39 wherein said memory further stores instructions that:
   select a search engine to at least partially generate said accumulated result set wherein said search engine selection is based at least partially on said search framework profile.

50. The system of claim 49 wherein said search engine is a plurality of search engines.

51. The system of claim 39 wherein said unit level composite relative strength value is less than an average relative strength value if at least one threshold for a relative strength value associated with a search framework profile characteristic for said corresponding unit of information is not achieved.

52. A system for creating a search framework profile for use with a framework reactive search facility, comprising
   a processor; and
   a memory storing instructions that:
   activate a Search Framework Profile ("SFP") Wizard responsive to a user request, wherein the SFP directs a search facility using one or more user-selected non-topical search characteristics, the non-topical search characteristics selected from a set of predefined non-topical search characteristics to generate the search framework profile;
   receive user input responsive to data displayed by said SFP Wizard;
   save said user input in a repository wherein said search framework profile comprises said user input; and
   wherein the SFP is usable by a search facility to retrieve search results comprising units of information, each unit of information having corresponding search framework metadata, which is used to rank the search results in accordance with a degree of affinity, wherein said degree of affinity is based at least partially on a unit level composite relative strength value associated with said corresponding unit of information, comprising one or more stored predefined relative strength values, each relative strength value corresponding directly and respectively to one or more of the user-selected non-topical search characteristics in the search framework profile.

53. The system of claim 52 wherein said search framework profile is a plurality of search framework profiles.

54. The system of claim 52 wherein said search framework profile has a framework identifier wherein said framework identifier is formed from said user input.

55. The system of claim 54 wherein said framework identifier is a search framework profile name.

56. The system of claim 52 wherein said search framework profile comprises at least one characteristic of a searcher.

57. The system of claim 56 wherein said search framework profile further comprises at least one specification of a search objective.

58. The system of claim 52 wherein said search framework profile further comprises at least one specification of a search domain.

59. A system for information interchange between a plurality of search engines, comprising:
   a processor; and
   a memory storing instructions that:
   store information, related to processing by a first search engine, in a first area associated with a search framework profile wherein the search framework profile directs a search facility using one or more user-selected non-topical search characteristics, the non-topical search characteristics selected from a set of predefined non-topical search characteristics to generate the search framework profile; and
   retrieve at least a subset of said information from said first area by a second search engine, the subset of said information comprising search framework metadata used by the second search engine for ranking identifiers of an accumulated results set returned by the second search engine; and
   wherein the search framework profile is usable by a search facility to retrieve search results comprising units of information, each unit of information having corresponding search framework metadata, which is used to rank the search results in accordance with a degree of affinity, wherein said degree of affinity is based at least partially on a unit level composite relative strength value associated with said corresponding unit of information, comprising one or more stored predefined relative strength values, each relative strength value corresponding directly and respectively to one or more of the user-selected non-topical search characteristics in the search framework profile.

60. The system of claim 59 wherein said memory further stores instructions that utilize said first area at least in part to exclude said first search engine from a plurality of search engines eligible for use by a framework reactive search facility to perform a user requested search operation.

61. A system for delivering search results responsive to a user search request, comprising:
   a processor; and
   a memory storing instructions that:
   receive a search request from a user wherein said search request comprises a search objective and at least one search term, the search objective selected from a set of predefined search objectives to generate a search framework profile;
   generate a set of identifiers wherein each identifier within said set of identifiers facilitates access to a corresponding unit of information in a data store, and wherein said corresponding unit of information comprises said at least one search term;
   rank the identifiers of said set of identifiers in accordance with the degree of affinity of each of said corresponding units of information to said search objective to form a ranked set of identifiers, each unit of information having corresponding search framework metadata, which is used to rank the search results in accordance with a degree of affinity, wherein said degree of affinity is based at least partially on a unit level composite relative strength value associated with said corresponding unit of information, comprising one or more stored predefined relative strength values, each relative strength value corresponding directly and respectively to one or more of the user-selected non-topical search characteristics in the search framework profile; and deliver said ranked set of identifiers to said user.

62. An article of manufacture for use in a computer system tangibly embodying computer instructions on a computer readable storage medium executable by said computer system to perform process steps for delivering search results responsive to a user search request, said process steps comprising:

receiving a search request from a user wherein said search request comprises a search framework profile and at least one search term wherein the search framework profile directs a search facility using one or more user-selected non-topical search characteristics, the non-topical search characteristics selected from a set of predefined non-topical search characteristics to generate the search framework profile;

generating an accumulated result set of identifiers wherein each identifier within said set of identifiers facilitates access to a corresponding unit of information in a data store, and wherein said corresponding unit of information comprises said at least one search term;

ranking the identifiers of said accumulated result set in accordance with the degree of affinity of each of said corresponding units of information to said search framework profile to form a final result set, wherein said degree of affinity is based at least partially on a unit level composite relative strength value associated with said corresponding unit of information, each unit of information having corresponding search framework metadata comprising one or more stored predefined relative strength values, each relative strength value corresponding directly and respectively to one or more of the user-selected non-topical search characteristics in the search framework profile; and delivering said final result set to said user.

63. The article of manufacture of claim 62 wherein said corresponding unit of information comprises a web page.

64. The article of manufacture of claim 62 wherein said data store comprises a computing network.

65. The article of manufacture of claim 64 wherein said computing network comprises a World Wide Web.

66. The article of manufacture of claim 62 wherein said data store comprises a computer.

67. The article of manufacture of claim 62 wherein said ranking further comprises deleting at least one identifier from said set of identifiers when said degree of affinity is below a threshold value.

68. The article of manufacture of claim 62 wherein said search framework profile comprises a plurality of search framework profiles.

69. The article of manufacture of claim 62 wherein said receiving comprises:

receiving a search framework identifier; and retrieving said search framework profile from a repository utilizing said search framework identifier.

70. The article of manufacture of claim 69 wherein said repository is a computer file.

71. The article of manufacture of claim 69 wherein said repository is a relational database and said search framework profile is in the form of a database table.

72. The article of manufacture of claim 62 further comprising:

selecting a search engine to at least partially generate said accumulated result set wherein said search engine selection is based at least partially on said search framework profile.

73. The article of manufacture of claim 72 wherein said search engine is a plurality of search engines.

74. The article of manufacture of claim 62 wherein said unit level composite relative strength value is less than an average relative strength value if at least one threshold for a relative strength value associated with a search framework profile characteristic for said corresponding unit of information is not achieved.

75. An article of manufacture for use in a computer system tangibly embodying computer instructions on a computer readable storage medium executable by said computer system to perform process steps for creating a search framework profile for use with a framework reactive search facility, said process steps comprising:

activating a Search Framework Profile ("SFP") Wizard responsive to a user request; receiving user input responsive to data displayed by said SFP Wizard; and saving said user input in a repository wherein said search framework profile comprises said user input wherein the search framework profile directs a search facility using one or more user-selected non-topical search characteristics, the non-topical search characteristics selected from a set of predefined non-topical search characteristics to generate the search framework profile; and wherein the SFP is usable by the search facility to retrieve search results comprising units of information, each unit of information having corresponding search framework metadata, which is used to rank the search results in accordance with a degree of affinity, wherein said degree of affinity is based at least partially on a unit level composite relative strength value associated with said corresponding unit of information, comprising one or more stored predefined relative strength values, each relative strength value corresponding directly and respectively to one or more of the user-selected non-topical search characteristics in the search framework profile.

76. The article of manufacture of claim 75 wherein said search framework profile is a plurality of search framework profiles.

77. The article of manufacture of claim 75 wherein said search framework profile has a framework identifier wherein said framework identifier is formed from said user input.

78. The article of manufacture of claim 77 wherein said framework identifier is a search framework profile name.

79. The article of manufacture of claim 75 wherein said search framework profile comprises at least one characteristic of a searcher.

80. The article of manufacture of claim 79 wherein said search framework profile further comprises at least one specification of a search objective.

81. The article of manufacture of claim 80 wherein said search framework profile further comprises at least one specification of a search domain.

82. An article of manufacture for use in a computer system tangibly embodying computer instructions on a computer readable storage medium executable by said computer system to perform process steps for information interchange between a plurality of search engines, said process steps comprising:

storing information, related to processing by a first search engine, in a first area associated with a search framework profile wherein the search framework profile directs a search facility using one or more user-selected non-topical search characteristics, the non-topical search characteristics selected from a set of predefined non-topical search characteristics to generate the search framework profile; and retrieving at least a subset of said information from said first area by a second search engine, the subset of said information comprising search framework metadata used by the second search engine for ranking identifiers of an accumulated results set returned by the second search engine, the identifiers of the accumulated results set ranked in accordance with a degree of affinity of each of a unit of information corresponding to said identifiers;

wherein the search framework profile is usable by a search facility to retrieve search results comprising units of information, each unit of information having corresponding search framework metadata, which is used to rank the search results in accordance with a degree of affinity, wherein said degree of affinity is based at least partially on a unit level composite relative strength value associated with said corresponding unit of information, comprising one or more stored predefined relative strength values, each relative strength value corresponding directly and respectively to one or more of the user-selected non-topical search characteristics in the search framework profile.

83. The article of manufacture of claim 82 further comprising utilizing said first area at least in part to exclude said first search engine from a plurality of search engines eligible for use by a framework reactive search facility to perform a user requested search operation.

84. An article of manufacture for use in a computer system tangibly embodying computer instructions on a computer readable storage medium executable by said computer system to perform process steps for delivering search results responsive to a user search request, said process steps comprising:

receiving a search request from a user wherein said search request comprises a search objective and at least one search term, the search objective selected from a set of predefined search objectives to generate a search framework profile;

generating a set of identifiers wherein each identifier within said set of identifiers facilitates access to a corresponding unit of information in a data store, and wherein said corresponding unit of information comprises said at least one search term;

ranking the identifiers of said set of identifiers in accordance with the degree of affinity of each of said corresponding units of information to said search objective to form a ranked set of identifiers, each unit of information having corresponding search framework metadata, which is used to rank the search results in accordance with a degree of affinity, wherein said degree of affinity is based at least partially on a unit level composite relative strength value associated with said corresponding unit of information, comprising one or more stored predefined relative strength values, each relative strength value corresponding directly and respectively to one or more of the user-selected non-topical search characteristics in the search framework profile; and delivering said ranked set of identifiers to said user.

* * * * *